United States Patent
Ishii et al.

(10) Patent No.: US 6,953,640 B2
(45) Date of Patent: Oct. 11, 2005

(54) GRAPHITE PARTICLES AND LITHIUM SECONDARY BATTERY USING THE SAME AS NEGATIVE ELECTRODE

(75) Inventors: Yoshito Ishii, Hitachi (JP); Tatsuya Nishida, Hitachi (JP); Atsushi Fujita, Hitachi (JP); Kazuo Yamada, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 212 days.

(21) Appl. No.: 10/150,107

(22) Filed: May 20, 2002

(65) Prior Publication Data

US 2003/0022064 A1 Jan. 30, 2003

Related U.S. Application Data

(62) Division of application No. 09/824,002, filed on Apr. 3, 2001, now Pat. No. 6,447,956, which is a division of application No. 09/230,889, filed as application No. PCT/JP97/02762 on Aug. 7, 1997, now Pat. No. 6,344,296.

(30) Foreign Application Priority Data

| Aug. 8, 1996 | (JP) | 08-209713 |
| Oct. 4, 1996 | (JP) | 08-264265 |
| Oct. 30, 1996 | (JP) | 08-288109 |
| Dec. 4, 1996 | (JP) | 08-323921 |
| Dec. 26, 1996 | (JP) | 08-348405 |
| Dec. 26, 1996 | (JP) | 08-348406 |

(51) Int. Cl.$^7$ ............................................. H01M 4/58
(52) U.S. Cl. ................... 429/231.8; 429/231.4; 429/217; 429/233; 423/448; 423/445 R
(58) Field of Search .................. 429/231.4, 217, 429/231.8, 233; 423/448, 445 R

(56) References Cited

U.S. PATENT DOCUMENTS 5,268,398 A  12/1993  Nakagawa et al. ......... 523/158
5,660,948 A   8/1997  Barker (Continued)

FOREIGN PATENT DOCUMENTS

| EP | 0328131 | 8/1989 |
| EP | 0612117 A2 | 8/1994 |
| EP | 0690518 | 1/1996 |

(Continued)

OTHER PUBLICATIONS

Patent Abstracts of Japan, vol. 1995, No. 01, Feb. 28, 1995.
Chemistry and Engineering of Carbon Materials, (p. 212), by: Isao Mochida, published Sep. 10, 1990.
Catalytic Graphitization Phenomenon, No. 102, pp. 118–131, 1980, Asao Otani.

*Primary Examiner*—Laura Weiner
(74) *Attorney, Agent, or Firm*—Antonelli, Terry, Stout and Kraus, LLP

(57) ABSTRACT

A graphite particle obtained by assembling or binding together a plurality of flat-shaped particles so that the planes of orientation are not parallel to one another, or a graphite particle in which aspect ratio is 5 or less or specific surface area is 8 m$^2$/g or less or the size of crystallite in the direction of c-axis of the crystal is 500 Å or more and the size of crystallite in the direction of plane is 1,000 Å or less as measured by X ray broad angle diffraction, or a graphite particle in which pore volume of the pores having a size falling in a range of $10^2$ to $10^6$ Å is 0.4 to 2.0 cc/g per weight of graphite particle or pore volume of the pores having a size falling in a range of $1 \times 10^2$ to $2 \times 10^4$ Å is 0.08 to 0.4 cc/g per weight of graphite particle is suitable for production of negative electrode of lithium secondary battery, and a lithium secondary battery obtained therefrom is excellent in rapid charge-discharge characteristics, cycle characteristics, etc.

2 Claims, 4 Drawing Sheets

U.S. PATENT DOCUMENTS

| | | | |
|---|---|---|---|
| 5,665,265 A | 9/1997 | Gies et al. | |
| 5,681,357 A | 10/1997 | Eschbach et al. | |
| 5,795,678 A | 8/1998 | Takami et al. | 429/218.1 |
| 5,856,043 A * | 1/1999 | Ohsaki et al. | 429/332 |
| 6,030,726 A * | 2/2000 | Takeuchi et al. | 429/231.8 |
| 6,444,365 B2 | 9/2002 | Ishii et al. | |
| 6,447,956 B2 | 9/2002 | Ishii et al. | |

FOREIGN PATENT DOCUMENTS

| | | |
|---|---|---|
| JP | A 47-22395 | 10/1972 |
| JP | 61-127612 | 6/1986 |
| JP | 1-294356 | 11/1989 |
| JP | 3-137011 | 6/1991 |
| JP | 5-307958 | 11/1993 |
| JP | 5-307977 | 11/1993 |
| JP | 5-335016 | 12/1993 |
| JP | 8-50897 | 7/1994 |
| JP | A-6-275279 | 9/1994 |
| JP | A-6-295725 | 10/1994 |
| JP | 07073868 | 3/1995 |
| JP | A 7-105935 | 4/1995 |
| JP | 7134988 | 5/1995 |
| JP | A-7-226204 | 8/1995 |
| JP | 7-282799 | 10/1995 |
| JP | 7-296814 | 11/1995 |
| JP | 8007885 | 1/1996 |
| JP | 8-31422 | 2/1996 |
| JP | A-8-031455 | 2/1996 |
| JP | A-8-083608 | 3/1996 |
| JP | A-8-213048 | 8/1996 |
| JP | A-9-190821 | 7/1997 |
| JP | 9199126 | 7/1997 |
| JP | 10003922 | 1/1998 |
| JP | 10-158005 | 6/1998 |
| WO | WO95/28011 | 10/1995 |
| WO | 97/12409 | 8/1996 |
| WO | WO 9738459 | 10/1997 |
| WO | WO97/42671 | 11/1997 |

* cited by examiner

GRAPHITE PARTICLES AND LITHIUM SECONDARY BATTERY USING THE SAME AS NEGATIVE ELECTRODE

This application is a Divisional application of application Ser. No. 09/824,002, filed Apr. 3, 2001 (now U.S. Pat. No. 6,447,956), which application is a Divisional application of application Ser. No. 09/230,889, filed Feb. 2, 1999 (now U.S. Pat. No. 6,344,296), which is an Application under 35 USC 371 of International application Ser. No. PCT/JP97/02762, filed Aug. 7, 1997.

TECHNICAL FIELD

This invention relates to a novel graphite particle, a process for producing the same, a graphite paste using the graphite particle, a negative electrode for lithium secondary battery using the graphite paste, a process for producing the negative electrode, and a lithium secondary battery. More particularly, this invention relates to a lithium secondary battery suitable for use in portable instruments, electric cars, electric power storage, etc. and excellent in the rapid charge-discharge characteristics, the cycle characteristics, etc., and to graphite particle for use as a negative electrode thereof, a process for producing the graphite particle, a graphite paste using the graphite particle, a negative electrode for lithium secondary battery using the graphite paste, and a process for producing the negative electrode.

BACKGROUND ART

As prior art graphite particles, natural graphite particle, artificial graphite particle prepared by graphitization of coke, artificial graphite particle prepared by graphitization of organic polymeric material, pitch and the like, graphite particles prepared by pulverizing these graphites, etc. can be referred to. These graphite particles are put to use as a negative electrode for lithium secondary battery by mixing a graphite particle with an organic binder and an organic solvent to prepare a graphite paste, coating a copper foil surface with the graphite paste, and then evaporating the solvent. For instance, it is intended in JP-B 62-23433 to eliminate the problem of internal short-circuit caused by lithium dendrite and to improve the cycle characteristics by using graphite as negative electrode.

However, in the natural graphite particle in which graphite crystals are well grown and in the artificial graphites prepared by graphitization of coke, the interlaminar bonding force in the direction of c-axis of crystal is weaker than the bonding force in the crystal face direction, and therefore the bonding between graphite layers is broken upon pulverization to form the so-called "flake graphite" having a large aspect ratio. If the flake graphite particle having a great aspect ratio is kneaded together with a binder and coated onto a current collector to form an electrode, the flaky graphite particles are oriented in the plane direction of current collector. As its result, due to repeated occlusion of lithium into graphite crystal and its release, a strain arises in the direction of c-axis, which causes an internal breakage of electrode. Thus, the cycle characteristics are deteriorated and, in addition, the rapid charge-discharge characteristics tend to become worse.

Further, prior art graphite particles having a large crystallite size in the face direction requires a long period of time for occlusion and release of lithium. Further, prior flaky graphite particles having a high aspect ratio have a great specific surface area. Thus, the lithium secondary battery obtained therefrom has a large irreversible capacity in the first cycle and, in addition, such graphite particles are poor in adhesiveness to current collector so that a large quantity of binder is needed. If the adhesiveness to current collector is not good, the current-collecting effect is not good and discharge capacity, rapid charge-discharge characteristics and cycle characteristics are deteriorated. Thus, it is desired to develop a graphite particle excellent in the rapid charge-discharge characteristics and cycle characteristics, or small in the irreversible capacity in the first cycle and excellent in cycle characteristics, or small in the irreversible capacity in the first cycle and capable of improving rapid charge-discharge characteristics and cycle characteristics, in the form of a lithium secondary battery.

DISCLOSURE OF INVENTION

This invention provides graphite particles solving the problems mentioned above and suitable for use as a negative electrode of a lithium secondary battery excellent in rapid charge-discharge characteristics and cycle characteristics.

This invention further provides graphite particles suitable for use as a negative electrode of lithium secondary battery small in the irreversible capacity of the first cycle and excellent in cycle characteristics.

This invention further provides a process for producing graphite particles suitable for use as a negative electrode of a lithium secondary battery which is excellent in rapid charge-discharge characteristics and cycle characteristics, or small in the irreversible capacity of the first cycle and excellent in cycle characteristics, or small in the irreversible capacity of the first cycle and excellent in the rapid charge-discharge characteristics and cycle characteristics.

This invention further provides a graphite paste suitable for use as a negative electrode of a lithium secondary battery which is excellent in rapid charge-discharge characteristics and cycle characteristics, or small in the irreversible capacity of the first cycle and excellent in cycle characteristics, or small in the irreversible capacity of the first cycle and excellent in the rapid charge-discharge characteristics and cycle characteristics.

This invention further provides a negative electrode of a lithium secondary battery which has a high capacity, and is excellent in the rapid charge-discharge characteristics and cycle characteristics, or small in the irreversible capacity of the first cycle and excellent in cycle characteristics, or small in the irreversible capacity and excellent in the rapid charge-discharge characteristics and cycle characteristics, and a process for producing said negative electrode.

This invention further provides a lithium secondary battery which has a high capacity, and is excellent in the rapid charge-discharge characteristics and cycle characteristics, or small in the irreversible capacity of the first cycle and excellent in the cycle characteristics, or small in the irreversible capacity of the first cycle and excellent in the rapid charge-discharge characteristics and cycle characteristics.

The graphite particles of this invention have the following characteristic features (1) to (6).
(1) Graphite particles obtained by assembling or binding together a plurality of flat-shaped particles so that the planes of orientation do not become parallel to one another.
(2) Graphite particles in which aspect ratio of the graphite particle is 5 or less.
(3) Graphite particles in which specific surface area is 8 $m^2/g$ or less.
(4) Graphite particles in which the size of crystal-lite in the direction of c-axis (the direction of thick-ness) of the crystal is 500 Å or more and the size of crystallite in the direction of plane is 1,000 Å or less, both as measured by X ray broad angle diffraction.

(5) Graphite particles in which pore volume of pores having a size falling in the range of $10^2$ Å to $10^6$ Å is 0.4 to 2.0 cc/g based on the weight of graphite particle.

(6) Graphite particles in which pore volume of pores having a size fall in the range of $1 \times 10^2$ Å to $2 \times 10^4$ Å is 0.08 to 0.4 cc/g based on the weight of graphite particle.

This invention further relates to a process for producing graphite particles described above characterized by mixing together an aggregate (raw material) which can be graphitized, graphite, a binder which can be graphitized, and 1 to 50% by weight of a graphitizing catalyst, followed by calcination and pulverization of the mixture.

This invention further relates to a graphite paste obtained by adding an organic binder and a solvent to the above-mentioned graphite particles or graphite particles produced by the above-mentioned process, and homogenizing the mixture.

The negative electrode for the lithium secondary battery of this invention is produced by the use of the above-mentioned graphite paste, and has the following characteristic features (1) to (3).

(1) A negative electrode for a lithium secondary battery obtained by coating the above-mentioned graphite paste onto a current collector and forming an integrated body.

(2) A negative electrode for a lithium secondary battery obtained by integrating a mixture of graphite particles and organic binder and a current collector, wherein the pressed and integrated mixture of graphite particles and organic binder has a density of 1.5 to 1.9 g/cm$^3$.

(3) A negative electrode for a lithium secondary battery obtained by integrating a mixture of graphite particles and organic binder and a current collector, wherein the content of the organic binder is 3 to 20% by weight based on said mixture.

This invention further relates to a process for producing the negative electrode for lithium secondary battery of (2), characterized by adding 1 to 50% by weight of a graphitizing catalyst to an aggregate which can be graphitized or graphite and a binder which can be graphitized, homogenizing the mixture, calcining it, pulverizing it to obtain graphite particles, adding and mixing an organic binder and a solvent to the graphite particles, coating the mixture onto a current collector, and evaporating the solvent, followed by pressing and integration.

Further, this invention relates to a lithium secondary battery comprising a casing, a cover, at least one pair of negative and positive electrodes, said casing, cover and electrodes being disposed through intermediation of separators, and an electrolytic solution provided in the neighborhood of said casing, cover and electrodes, wherein said negative electrode is produced by the use of the above-mentioned graphite particles.

BRIEF DESCRIPTION OF DRAWINGS

FIGS. 1A and 1B are scanning electron microscopic photographs of the graphite particles of this invention, wherein FIG. 1A is a photograph of the outer surface of the particle and FIG. 1B is a photograph of a section of the particle.

BEST MODE FOR CARRYING OUT THE INVENTION

The graphite particles of this invention can be classified into six according to characteristic feature thereof.

The first graphite particle of this invention is a graphite particle in which a plurality of flat-shaped particles are assembled or bound together so that the planes of orientation thereof are not parallel to one another.

In this invention, the term "flat-shaped particle" means a particle so shaped as to have a major axis and a minor axis, namely so shaped as not to be a perfect sphere. For instance, this include scale-shaped ones, flake-shaped ones and a part of lump-shaped ones.

The term "planes of orientation are not parallel to one another" in a plurality of flat-shaped particles means a state that a plurality of particles are assembled so that the planes of orientation thereof are not arranged in one direction, when a flat-shaped plane of each particle or, in other words, a plane closest to flatness, is taken as a plane of orientation.

From the viewpoint of constituent material, the individual flat-shaped particles are preferably made of a raw material (aggregate) which can be graphitized or of graphite.

In the graphite particles mentioned above, the flat-shaped particles are assembled or bound together. The term "bound together" means a state that particles are made to adhere to each other through intermediation of a binder or the like, and the term "assembled" means a state that particles retain a form of gathered body due to shapes thereof or the like, while each particles are not made to adhere to each other through intermediation of binder or the like. From the viewpoint of mechanical strength, particles bound together are preferred.

The size of individual flat-shaped particles is preferably 1 to 100 μm and further preferably 1 to 50 μm, as expressed in terms of mean particle diameter. It is preferable that this size of individual flat-shaped particles is ⅔ time or less as large as the mean particle size of the assembled or bound together graphite particle. In one graphite particle, the number of assembled or bound-together flat-shaped particles is preferably 3 or more. In this invention, the mean particle sizes can be measured with a laser diffraction particle size distribution meter.

If such graphite particles are used as a negative electrode, the graphite crystals do not readily undergo orientation onto a current collector, and lithium is readily occluded into the graphite constituting negative electrode and readily released therefrom. As a result, the rapid charge-discharge characteristics and cycle characteristics of the lithium secondary electrode obtained therefrom can be improved.

Figure 1A:
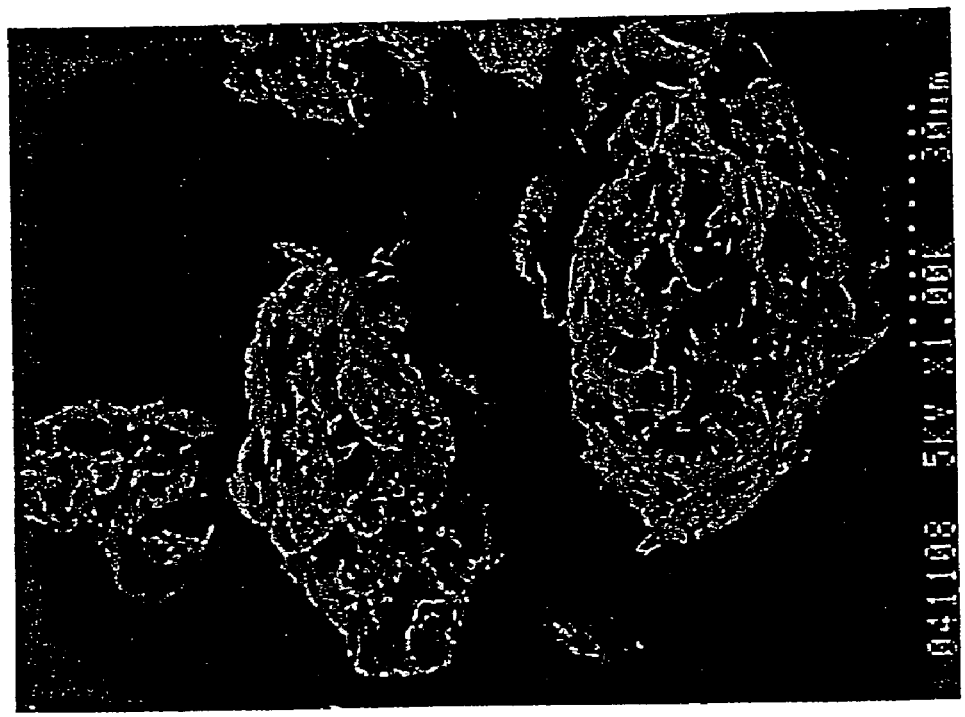
Figure 1B:
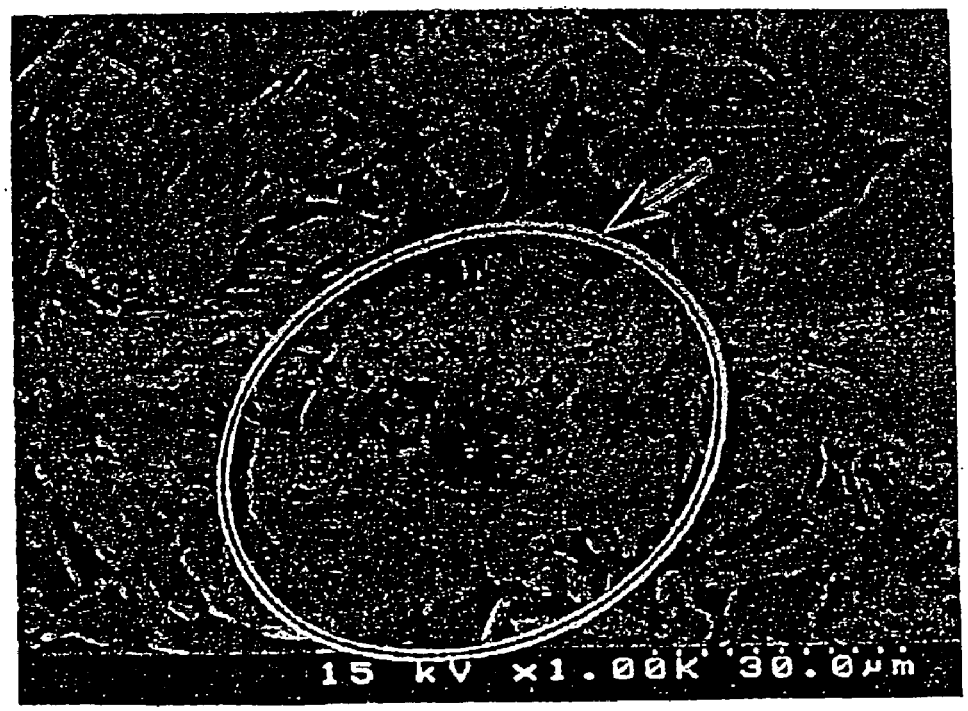

FIGS. 1A and 1B are scanning electron microscopic photographs of an example of the graphite particles of this invention, wherein FIG. 1A is a scanning electron microscopic photograph of the outer surface of the graphite particle of this invention, and FIG. 1B is a scanning electron microscopic photograph of a section of the graphite particle. In FIG. 1A, it can be observed that many flaky graphite particles are bound together so that the planes of orientation thereof are not parallel to one another, to form a graphite particle.

The second graphite particle of this invention is a graphite particle having an aspect ratio of 5 or less. When this graphite particle is used, orientation of particles on a current collector is difficult to realize, so that lithium is readily occluded and released similarly to the above case.

The aspect ratio is preferably in the range of from 1.2 to 5. When the aspect ratio is smaller than 1.2, contact area between particles decreases, due to which conductivity decreases. For the same reason as above, a more preferable range of aspect ratio is 1.3 or more.

On the other hand, the upper limit of the aspect ratio is 5, and preferably 3 or less. When the aspect ratio is greater than 5, the rapid charge-discharge characteristics tend to be deteriorated. Thus, the most preferable value of the aspect ratio is 1.3 to 3.

If the length of graphite particle in the direction of major axis is expressed by A and that in the direction of minor axis is expressed by B, an aspect ratio is expressed by A/B. In this invention, aspect ratio is determined by magnifying graphite particles under a microscope, selecting 100 graphite particles at random, measuring A/B thereof, and calculating mean value thereof.

Of the graphite particles having an aspect ratio of 5 or less, an assembly or bound material of graphite particles having a smaller size is preferable.

The third graphite particle of this invention is a graphite particle having a specific surface area of 8 $m^2/g$ or less. The specific area is preferably 5 $m^2/g$ or less, more preferably 1.5–5 $m^2/g$, and further preferably 2–5 $m^2/g$. By using such a graphite particle as a negative electrode, the rapid charge-discharge characteristics and cycle characteristics of the lithium secondary battery obtained therefrom can be improved, and the irreversible capacity in the first cycle can be decreased. If the specific surface area is greater than 8 $m^2/g$, the irreversible capacity of the first cycle of the lithium secondary battery obtained therefrom is high and the energy density is low, and further there is a problem that the preparation of negative electrode requires to use a large quantity of binder. On the other hand, if, the specific surface area is smaller than 1.5 $m^2/g$, the rapid charge-discharge characteristics and cycle characteristics of the lithium secondary battery obtained therefrom tend to be deteriorated. The specific surface area can be measured by known methods such as BET method (nitrogen gas adsorption method) or the like.

The fourth graphite particle of this invention is a graphite particle in which, as measured by X ray broad angle diffraction, the size Lc of crystallite in the c-axis direction of crystal (002) is 500 Å or more and the size La of crystallite in the plane direction (110) is 1,000 Å or less. By using such a graphite particle as a negative electrode, the rapid charge-discharge characteristics and cycle characteristics of the lithium secondary battery obtained therefrom can be improved. The size Lc of crystallite in the c-axis direction of crystal (002) is preferably in the range of from 1,000 to 100,000 Å, provided that Lc (002) exceeding 3,000 Å cannot be determined accurately by means of X ray broad angle diffraction, and the size La of crystallite in the crystal plane direction (110) is preferably in the range of from 800 to 50 Å.

If size Lc (002) of crystallite in the c-axis direction is less than 500 Å or if size La (110) of crystallite in the crystal plane direction is greater than 1000 Å, charge capacity becomes smaller.

In the fourth graphite particle, the interlaminar distance d (002) of crystal measured by X ray broad angle diffraction of graphite particle is preferably 3.38 Å or less and further preferably in the range of from 3.37 to 3.35 Å. If the interlaminar distance d (002) of crystal exceeds 3.38 Å, charge capacity tends to decrease.

The fifth graphite particle of this invention is characterized in that the pore volume of pores having a size falling in the range of $10^2$ to $10^6$ Å is 0.4 to 2.0 cc/g based on the weight of graphite particle. By using such a graphite particle as a negative electrode, the expansion and contraction of electrode upon charge and discharge are absorbed by the pores of graphite particles, due to which the internal breakage of electrode can be suppressed, which results in an improvement of cycle characteristics of the lithium secondary battery obtained therefrom. The pore volume of the pores having a size falling in the range of $10^2$ to $10^6$ Å is more preferably in the range of 0.4 to 1.5 cc/g, and further preferably in the range of 0.6 to 1.2 cc/g. If the total pore volume is less than 0.4 cc/g, cycle characteristics are not good. If the total pore volume is greater than 2.0 cc/g, a large quantity of binder is necessary for integrating graphite particles and a current collector, which decreases the capacity of the lithium secondary battery produced. The pore volume can be determined by a pore diameter distribution measurement using the mercury-porosimeter method. Pore size can also be determined by a pore size distribution measurement using the mercury-porosimeter method.

The sixth graphite particle of this invention is characterized in that the pore volume of the pores having a size falling in the range of $1\times10^2$ to $2\times10^4$ Å is 0.08 to 0.4 cc/g based on the weight of graphite particle. If such a graphite particle is used as a negative electrode, the expansion and contraction of electrode upon charge and discharge are absorbed by the pores of graphite particle, due to which the internal breakage of electrode can be suppressed, which results in an improvement of cycle characteristics of the lithium secondary battery obtained therefrom. The pore volume of the pores having a size falling in the range of $1\times10^2$ to $2\times10^4$ Å is more preferably in the range of 0.1 to 0.3 cc/g. If the pore volume of the pores having a size falling in this range is smaller than 0.08 cc/g, cycle characteristics are not good. If the pore volume of the pores having a size falling in this range is greater than 4 cc/g, a large quantity of binder is necessary for integrating graphite particles and a current collector, which decreases the capacity of lithium secondary battery obtained therefrom. The pore volume of the pores having a size falling in this range can also be determined by a pore diameter distribution measurement by the mercury-porosimeter method.

In the above-mentioned second to sixth graphite particles of this invention, it is preferable that the graphite particle has the characteristic feature of the first graphite particle, namely that the graphite particle is a graphite particle in which a plurality of flat-shaped particles are assembled or bound together so that the planes of orientation are not parallel to one another. If such a graphite particle is used as a negative electrode, orientation of the graphite crystals on a current collector cannot be realized readily and occlusion of lithium into negative electrode graphite and its release from the negative electrode graphite are facilitated, and the rapid charge-discharge characteristics and cycle characteristics of the lithium secondary battery obtained therefrom can further be improved.

It is also preferable that the first graphite particle and the third to sixth graphite particles of this invention have the characteristic feature of the second graphite of this invention, namely that they have an aspect ratio of 5 or less, because thereby orientation of particles on a current collector is made difficult to realize and the occlusion and release of lithium are facilitated similarly to the above. Aspect ratio of the graphite particle is more preferably 3 or less. Lower limit of the aspect ratio is preferably 1.2 or more and further preferably 1.3 or more.

It is also preferable that the first and second graphite particles and the fourth to sixth graphite particles of this invention have the characteristic feature of the third graphite particle of this invention, namely that they have a specific surface area of 8 m$^2$/g or less, more preferably 5 m$^2$/g or less and further preferably 2 to 5 m$^2$/g. There is a tendency that, if the specific surface area increases, the irreversible capacity increases and energy density of the lithium secondary battery prepared therefrom decreases. There is also a tendency that, if the specific surface area increases, not only the irreversible capacity of the lithium secondary battery prepared therefrom increases, but the quantity of binder necessary for preparation of negative electrode also increases.

Further, in the first to third graphite particles and the fifth and sixth graphite particles of this invention, the interlaminar distance d (002) of crystal measured by X ray broad angle diffraction of graphite powder should preferably be 3.38 Å or less and more preferably 3.37 Å or less, because a smaller interlaminar distance d (002) gives a higher discharge capacity. On the other hand, the size of crystallite in the c-axis direction Lc (002) should preferably be 500 Å or more and further preferably 1,000 Å or more, because a greater Lc (002) gives a higher discharge capacity.

Further, it is preferable that the first to fourth graphite particles of this invention have the characteristic feature of the fifth and sixth graphite particles of this invention, namely that they have a pore volume corresponding to a pore of specified size, because thereby the expansion and contraction of electrode upon charge and discharge can be absorbed by the pores of graphite particles, due to which internal breakage of electrode can be suppressed and as its result the cycle characteristic of the lithium secondary battery can be improved.

In this invention, the size of the first to sixth graphite particles is preferably 1 to 100 μm and more preferably 10 to 50 μm, as expressed in terms of mean particle diameter.

Although the method for making the above-mentioned graphite particles fulfil the above-mentioned characteristic features is not particularly limited, such graphite particles can be obtained by adding and mixing 1 to 50% by weight of a graphitizing catalyst into a mixture of a raw material which can be graphitized or graphite and a binder which can be graphitized, followed by calcination and pulverization. By such a procedure, pores are formed in the spaces from which the graphitizing catalyst has been eliminated, and thereby good characteristic properties can be given to the graphite particle of this invention. The quantity of the graphitizing catalyst is preferably 3 to 20% by weight.

Further, each of the above-mentioned graphite particles can also be prepared by appropriately selecting the method for mixing graphite or aggregate with a binder, the mixing ratio such as quantity of binder, etc., and the conditions of pulverization after calcination.

As the raw material which can be graphitized, coke powder, carbonized product of resins, etc. can be used, and any powdery materials may be used without limitation, so far as the powdery materials can be graphitized. Among these powdery materials, coke powders which can easily be graphitized, such as needle coke and the like, are preferable.

As the graphite, natural graphite powder, artificial graphite powder and the like can be used. Any graphite can be used so far as it is powdery. Preferably, the raw material which can be graphitized and the graphite have a particle diameter smaller than that of the graphite particle produced according to this invention.

As the graphitizing catalyst, metals such as iron, nickel, titanium, silicon, boron and the like, carbides thereof and oxides thereof can be used. Of these graphitizing catalysts, carbides and oxides of silicon or boron are preferred.

Mean particle diameter of the graphitizing catalyst is preferably 150 μm or less, more preferably 100 μm or less, and further preferably 50 μm or less. When the mean particle diameter exceeds 150 μm, growth of crystals tends to be uneven and discharge capacity tends to be uneven.

The graphitizing catalyst is added in an amount of 1 to 50% by weight, preferably 5 to 40% by weight and more preferably 5 to 30% by weight, based on the graphite particle obtained. If the amount of graphitizing catalyst is less than 1% by weight, growth of graphite crystals is unsatisfactory and at the same time pore volume in the graphite particles tends to become small. On the other hand, if the amount of graphitizing catalyst is larger than 50% by weight, workability is deteriorated and at the same time pore volume in the graphite particles tend to become too large.

As the binder, organic materials such as tar, pitch, thermosetting resins, thermoplastic resins and the like are preferable. The amount of binder to be compounded is preferably 5 to 80% by weight, more preferably 10 to 80% by weight, and further preferably 15 to 80% by weight, based on flat-shaped raw material which can be graphitized or graphite. If the amount of the binder is too large or too small, there is a tendency that aspect ratio and specific surface area of the graphite particle obtained become too great.

The method for mixing together an aggregate which can be graphitized or a graphite and a binder is not particularly limited, and the mixing is carried out by means of a kneader. Preferably, the mixing is carried out at a temperature not lower than softening point of the binder. Concretely saying, the mixing is preferably carried out at 50 to 300° C. when the binder is pitch, tar or the like, and at 20 to 100° C. when the binder is a thermo-setting resin.

Subsequently, the mixture obtained above is calcined to perform a graphitizing treatment. If desired, the mixture may be formed into a desired shape before the graphitizing treatment. Further, if desired, the formed mixture may be pulverized before graphitizing treatment to adjust the particle diameter to a desired value. The calcination is preferably carried out under a condition where the mixture is difficult to oxidize. For instance, the calcination is carried out in an atmosphere of nitrogen or argon gas or in vacuum. Temperature of the graphitization is preferably 2,000° C. or above, more preferably 2,500° C. or above, and further preferably 2,800° C. to 3,200° C.

If the temperature of graphitization is low, graphite crystals cannot grow satisfactorily and the graphitizing catalyst tends to remain in the graphite particles. If the graphitizing catalyst remains in the graphite particles prepared, discharge capacity decreases. If the temperature of graphitization is too high, sublimation of graphite can occur.

It is preferable to pulverize the thus obtained graphitized product in the subsequent step. The method for pulverization of the graphitized product is not particularly limited, but known means such as jet mill, vibration mill, pin mill, hammer mill and the like may be used. Mean particle diameter after the pulverization is preferably 1 to 100 μm, and more preferably 10 to 50 μm. If the mean particle diameter is too great, there is a tendency that irregularities can readily be formed on the surface of electrode.

In this invention, the above-mentioned graphite particles 1 to 6 can be obtained via the steps mentioned above.

The graphite paste of this invention is produced by mixing the graphite particles mentioned above with an organic binder, a solvent, etc.

As said organic binder, polyethylene, polypropylene, ethylene-propylene terpolymer, butadiene rubber, styrene-butadiene rubber, butyl rubber, polymeric compounds having a high ionic conductivity, and the like can be used.

As said polymeric compounds having a high ionic conductivity, polyvinylidene fluoride, polyethylene oxide, polyepichlorohydrin, polyphosphazene, polyacrylonitrile and the like can be used.

Of these organic binders, polymeric compounds having a high ionic conductivity are preferred, and polyvinylidene fluoride is especially preferred.

Mixing ratio between the graphite particles and the organic binder is preferably 3 to 10 parts by weight of organic binder per 100 parts by weight of graphite particles.

The solvent is not particularly limited. Organic solvents such as N-methyl-2-pyrrolidone, dimethylformamide, isopropanol and the like are used.

The amount of the solvent is not particularly limited, but it may be any amount so far as the graphite paste can be adjusted to a desired viscosity. Preferably, 30 to 70% by weight of solvent is used based on graphite paste.

The negative electrode for lithium secondary battery of this invention is roughly classified into three types according to characteristic features.

The first negative electrode for lithium secondary battery of this invention is characterized by using one of the above-mentioned graphite particles. This negative electrode for lithium secondary battery can be obtained by forming the graphite paste into a shape of sheet, pellet, etc.

The graphite paste is coated onto a current collector and integrated together with the current collector to form a negative electrode.

As the current collector, metallic current collectors such as a foil or a mesh of nickel, copper or the like can be used. The integration can be performed by a molding method using a roll, a press or the like or by combination of these means.

The second negative electrode for lithium secondary battery of this invention is characterized in that a mixture of graphite particles and an organic binder is integrated together with a current collector and, after the integration, the mixture of graphite particles and binder has a density of 1.5 to 1.9 g/cm$^3$, preferably 1.55 to 1.85 g/cm$^3$, more preferably 1.6 to 1.85 g/cm$^3$, and further preferably 1.6 to 1.8 g/cm$^3$. By enhancing the density of the mixture of graphite particles and binder constituting the negative electrode of this invention, the lithium secondary battery obtained from the negative electrode can have an increased energy density per volume. If density of the mixture of graphite particles and organic binder exceeds 1.9 g/cm$^3$, the rapid charge-discharge characteristics are deteriorated. If the density is less than 1.5 g/cm$^3$, the lithium secondary battery obtained therefrom has a decreased energy density.

The graphite particle used in the second negative electrode for lithium secondary battery of this invention may be any graphite so far as its density can be designed so as to fall in the above-mentioned range. Materials other than the above-mentioned graphite particles of this invention such as natural graphite and the like are also usable. Of all these graphite particles, however, the above-mentioned graphite particles of this invention are especially preferred because the use of the graphite particles of this invention makes it possible to improve the discharge capacity, rapid charge-discharge characteristics and cycle characteristics when density of negative electrode of lithium secondary electrode prepared therefrom is enhanced.

The kinds of organic binder, current collector and solvent used in the second negative electrode for lithium secondary battery of this invention and mixing ratios of these ingredients may be the same as those in the first negative electrode for lithium secondary battery of this invention.

In order to make the density of the mixture of graphite particles and organic binder after integration fall in the above-mentioned range, it is preferable to carry out the integration of current collector and the mixture of graphite particles and organic binder while applying a pressure. The pressure may be applied by means of a roll, a press, etc.

The third negative electrode for lithium secondary battery of this invention is characterized in that the amount of the organic binder is 3 to 20% by weight and preferably 11 to 20% by weight based on the weight of the mixture of graphite particles and organic binder. By adjusting the amount of the organic binder so as to fall in such a range, discharge capacity of the negative electrode for lithium secondary battery per weight of the mixture can be made high. The amount of the organic binder is more preferably 12 to 16% by weight based on the weight of the mixture of graphite particles and organic binder. If the amount of the organic binder is less than 3% by weight, bonding forces between graphite particles and between graphite particle and current collector are weak, due to which resistance is high at interfaces thereof, conductivity of the lithium secondary battery prepared is low, and the discharge capacities per weight of graphite particles and per weight of the mixture of graphite particles and organic binder are low. Further, the graphite particles are expanded and contracted upon charge and discharge. Accordingly, when charge and discharge are repeated, a breakage becomes readily occurring between graphite particles and between graphite particle and current collector, due to which cycle characteristics are deteriorated. On the other hand, when the amount of the organic binder exceeds 20% by weight, a large quantity of organic binder of low conductivity exists between graphite particles and between graphite particle and current collector, due to which electrical conductivity of negative electrode decreases, discharge capacity per weight of graphite particle decreases, and as its result discharge capacity per weight of the mixture of graphite particles and organic binder decreases. Further, since the organic binder is not charged nor discharged, addition of an organic binder in an amount exceeding 20% by weight makes the amount of graphite particles in the mixture so small as less than 80% by weight, due to which the discharge capacity per weight of the mixture of graphite particles and organic binder becomes small.

The use of the above-mentioned graphite particles of this invention as the graphite particle of the third negative electrode for lithium secondary battery of this invention is preferable because, when the negative electrode of the lithium secondary battery prepared therefrom is made to have a high density, discharge capacity, rapid charge-discharge characteristics and cycle characteristics can be improved thereby.

The kinds of organic binder, current collector and solvent used in the third negative electrode for lithium secondary battery of this invention, the mixing ratio of these ingredients and the molding conditions of the current collector and the mixture may be the same as those in the first negative electrode for lithium secondary battery of this invention.

Like in the second negative electrode for lithium secondary battery, the molding conditions are preferably selected so as to give a density of 1.5 to 1.9 g/cm$^3$ to the integrated mixture of graphite particles and binder.

Each of the negative electrodes for lithium secondary battery is disposed so as to confront a positive electrode through intermediation of a separator, after which an electrolytic solution is poured. By such a procedure, there can be prepared a lithium secondary battery which is higher in capacity, more excellent in rapid charge-discharge characteristics and cycle characteristics and smaller in irreversible capacity than prior lithium secondary batteries.

The material used as a positive electrode of the lithium secondary battery of this invention is not particularly limited, and $LiNiO_2$, $LiCoO_2$, $LiMn_2O_4$ and the like can be used either alone or in the form of mixture.

As the electrolytic solution, the so-called organic electrolytic solutions prepared by dissolving a lithium salt such as $LiClO_4$, $LiPF_6$, $LiAsF_6$, $LiBF_4$, $LiSO_3CF_3$ and the like in a non-aqueous solvent such as ethylene carbonate, diethyl carbonate, dimethoxyethane, dimethyl carbonate, tetrahydrofuran, propylene carbonate and the like can be used.

As the separator, for instance, unwoven cloths, cloths, micro-porous films and combinations thereof using a polyolefin such as polyethylene, polypropylene or the like as a main component can be used.

Figure 2:
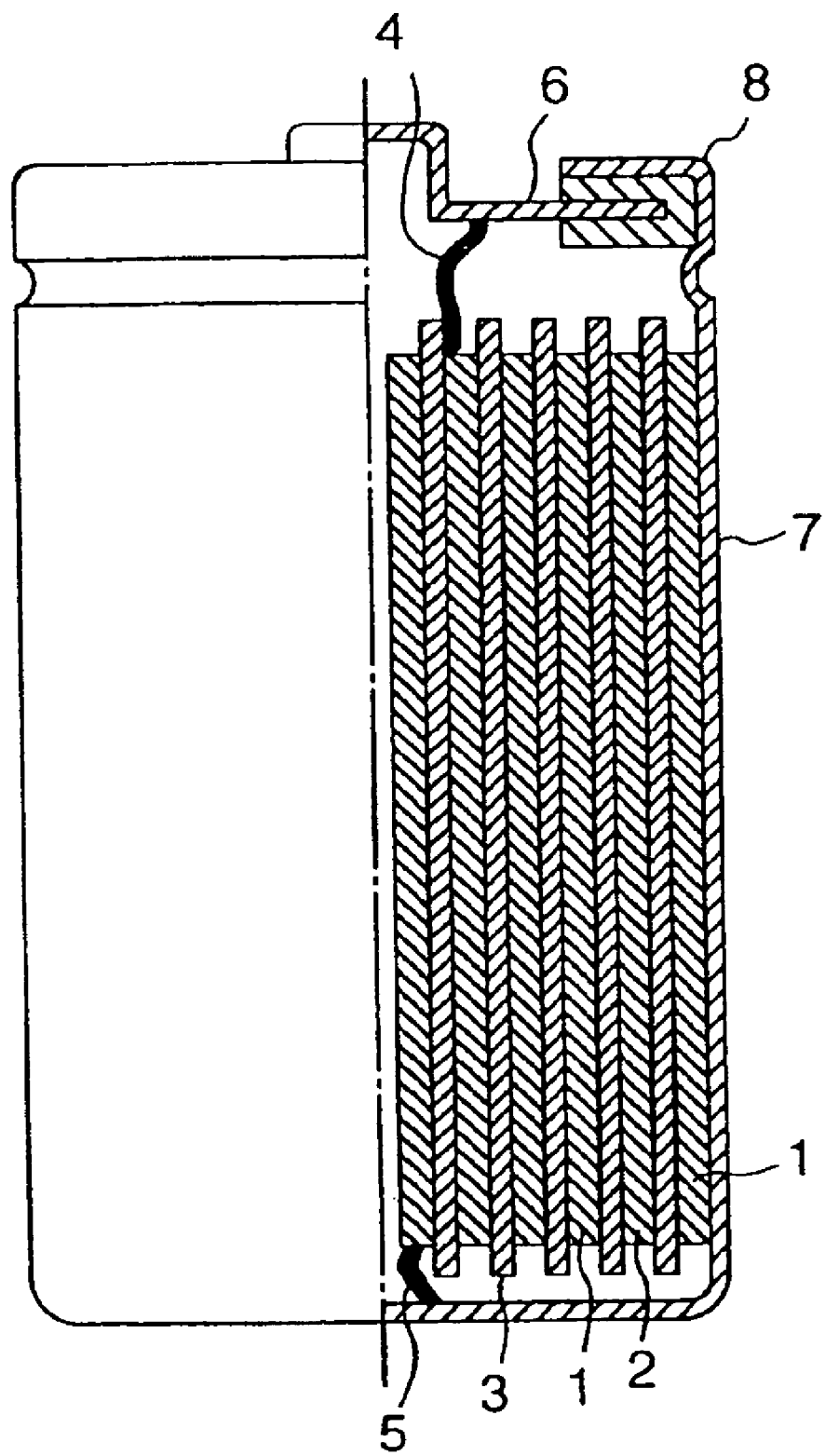
FIG. 2 is a partial sectional front view of a cylindrical lithium secondary battery.

FIG. 2 illustrates a partial sectional front view of one example of a cylindrical lithium secondary battery; wherein 1 is positive electrode, 2 is negative electrode, 3 is separator, 4 is positive electrode tab, 5 is negative electrode tab, 6 is positive electrode lid, 7 is battery can, and 8 is gasket.

Next, this invention is explained by referring to examples and, according to the need, drawings.

Examples 1–7 are examples in which the first, second and third graphite particles of this invention are used as the graphite particle, and the first negative electrode for lithium secondary battery of this invention is used as the negative electrode material for lithium secondary battery.

EXAMPLE 1

(1) Preparation of Graphite Particles

Seventy parts by weight of coke powder having a mean particle diameter of 10 μm, 20 parts by weight of tar pitch, 10 parts by weight of iron oxide and 20 parts by weight of coal tar were mixed together and stirred at 100° C. for one hour. The mixture was calcined at 2,800° C. in an atmosphere of nitrogen and then pulverized to obtain graphite particles having a mean particle diameter of 20 μm. According to a scanning electron microscopic photograph (SEM photograph) of the graphite particles thus obtained, the graphite particles had a structure in which a plurality of flat-shaped particles were bound together so that the planes of orientation were not parallel to one another. One hundred particles were selected at random from the graphite particles thus obtained, and a mean value of their aspect ratios was measured. As a result, the mean value was 1.8. In a X ray broad angle diffraction of the graphite particles thus obtained, the interlaminar distance d (002) of the crystal was 3.360 Å, and the size of crystallite Lc (002) was 1,000 Å or more. The specific surface area was 3.5 m$^2$/g as measured by BET method.

(2) Preparation of Lithium Secondary Battery

A lithium secondary battery having the shape shown in FIG. 2 was prepared in the following manner. As a positive electrode active material, 88% by weight of $LiCoO_2$ was used. As an electroconductive material, 7% by weight of a flaky natural graphite having a means particle diameter of 1 μm was used. As a binder, 5% by weight of polyvinylidene fluoride (PVDF) was used. To these materials was added N-methyl-2-pyrrolidone (its amount was 50% by weight based on the paste, hereinafter the same), and the mixture was homogenized to obtain a paste as a mixture for forming a positive electrode. In the same manner as above, a negative electrode active material was prepared by adding 10% by weight of PVDF as a binder to 90 parts by weight of the graphite powder obtained in (1). By adding thereto N-methyl-2-pyrrolidone (its amount was 50% by weight of the paste, hereinafter the same) and homogenizing the mixture, there was obtained a paste of a mixture for forming a negative electrode.

Subsequently, the paste of the mixture for forming a positive electrode, mentioned above, was coated onto both sides of an aluminum foil having a thickness of 25 μm and dried in vacuum at 120° C. for one hour. After dryness, an electrode was press-formed therefrom by means of roller press so as to have a thickness of 190 μm. The amount of coating of the mixture for forming a positive electrode per unit area was 49 mg/cm$^2$. It was cut into a size having a width of 40 mm and a length of 285 mm to prepare a positive electrode 1, provided that both terminal portions (each 10 mm in length) of the positive electrode 1 had no coating of the mixture for forming a positive electrode, so that the aluminum foil was exposed in these portions. To one of the exposed aluminum foil portions, positive tab 4 was contact-bonded by the ultrasonic bonding method.

On the other hand, the paste of mixture for forming a negative electrode was coated on both sides of a copper foil having a thickness of 10 μm and vacuum-dried at 120° C. for one hour. After dryness, an electrode was press-formed therefrom by means of a roller press and thickness was adjusted to 175 μm. The coating amount of the mixture for forming a negative electrode per unit area was 20 mg/cm$^2$, which was cut into a size of 40 mm in width and 290 mm in length to prepare negative electrode 2. Like the positive electrode 1, both terminal portions, each having a length of 10 mm, of the negative electrode 2 had no coating of the mixture for forming negative electrode, so that the copper foil was exposed. To one of the exposed copper foil portions, a negative electrode tab 5 was contact-bonded by means of ultrasonic wave.

As separator 3, a polyethylene-made micro-porous film having a thickness of 25 μm and a width of 44 mm was used. Then, as shown in FIG. 2, positive electrode 1, separator 3, negative electrode 2 and separator 3 were successively piled, and the laminate thus obtained was rolled to prepare an electrode group. The electrode group was inserted into a battery can 7 of Single-3 size, a negative electrode tab 5 was bonded to the can bottom by welding, and a squeezed part was provided for caulking a positive electrode lid 6. Then, an electrolytic solution prepared by dissolving 1 mol/liter of lithium hexafluoro-phosphate in 1:1 mixture of ethylene carbonate and dimethyl carbonate (not shown in the drawing) was poured into the battery can 7, a positive electrode tab 4 was bonded to positive electrode lid 6 by welding, and then the positive electrode lid 6 was caulked to obtain a lithium secondary battery.

Figure 3:
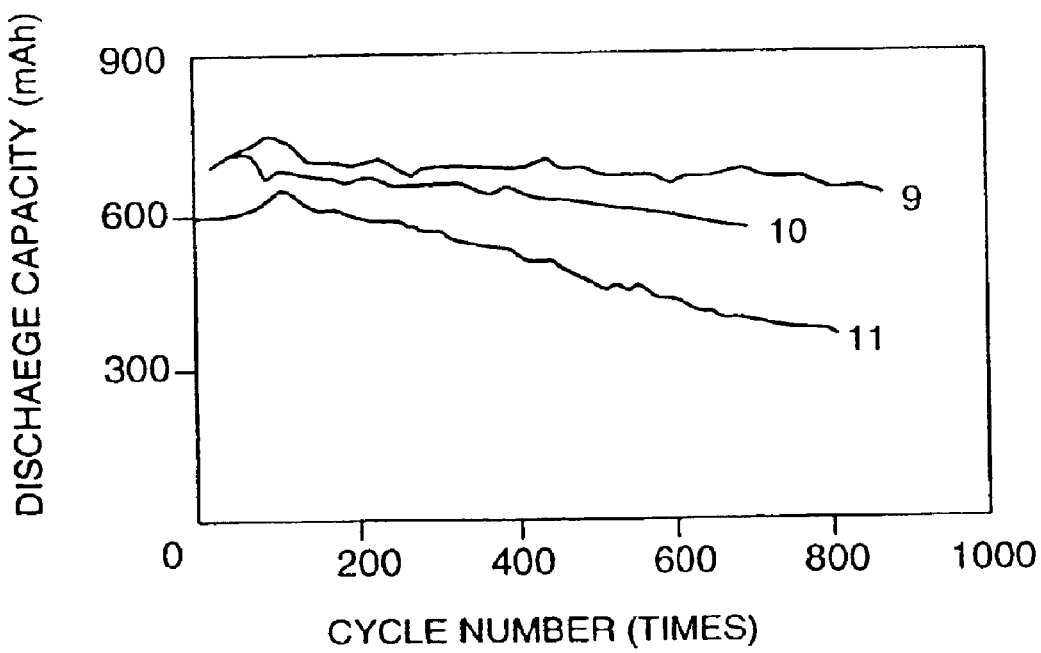
FIG. 3 is a graph illustrating the relation between discharge capacity and charge-discharge cycle number.
Figure 4:
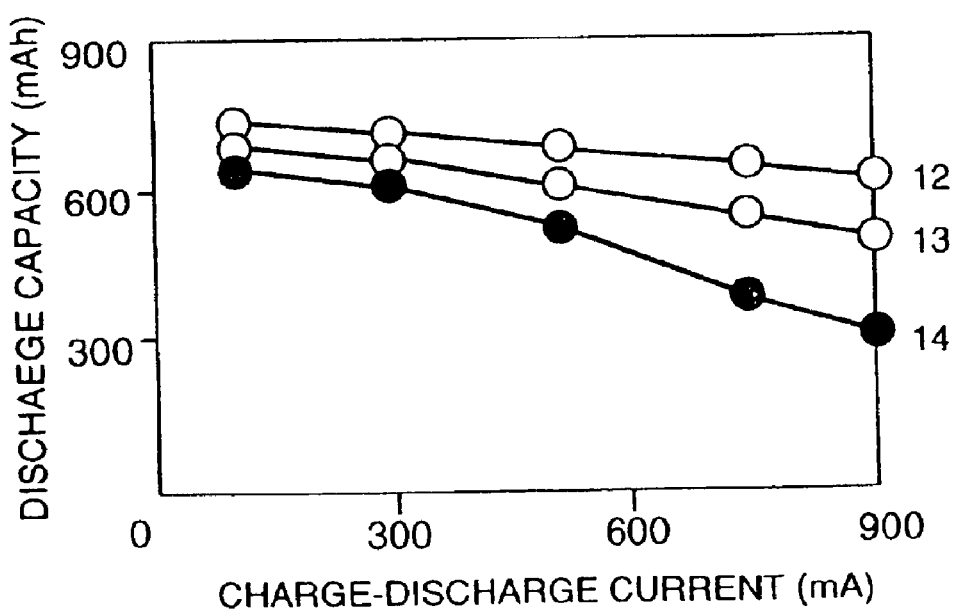
FIG. 4 is a graph illustrating the relation between discharge capacity and charge-discharge current.

On the lithium secondary battery thus obtained, charge and discharge were repeated at a charge-discharge current of 300 mA, a final charge voltage of 4.15 V and a final discharge voltage of 2.8 V. Further, a rapid charge-discharge was carried out while changing the charge-discharge current in a range of from 300 mA to 900 mA. The results are shown in FIG. 3 and FIG. 4.

EXAMPLE 2

Seventy parts by weight of coke powder having a mean particle diameter of 10 μm, 10 parts by weight of tar-pitch, 2 parts by weight of iron oxide and 20 parts by weight of coal tar were mixed together and stirred at 100° C. for one hour. Subsequently, the mixture was calcined in an atmosphere of nitrogen at 2,800° C. and then pulverized to obtain graphite particles having a mean particle diameter of 20 μm. An examination of the graphite particles thus obtained under an electron microscope revealed that a plurality of flat-shaped particles were assembled or bound together so that the planes of orientation thereof were not parallel to one another to form a graphite particle. One hundred particles were at random selected from the graphite particles, and mean value of aspect ratios thereof was determined to obtain a result of 4.8. X ray broad angle diffraction of the graphite particle thus obtained revealed that the interlaminar distance d (002) of the crystal was 3.363 Å and the size of crystallite Lc (002) was 1,000 Å or more. As measured by BET method, the specific area was 4.3 m$^2$/g.

A lithium secondary battery was prepared from the graphite particles thus obtained by the same procedure as in Example 1, and battery characteristics thereof were examined in the same manner as in Example 1. The results are shown in FIG. 3 and FIG. 4.

EXAMPLE 3

A coke powder having a mean particle diameter of 20 μm was calcined in an atmosphere of nitrogen at 2,800° C. to obtain graphite particles having a mean particle diameter of 20 μm. The graphite particles thus obtained constituted a flaky graphite having a mean aspect ratio of 6, a specific surface area of 11 m$^2$/g, an interlaminar distance d (002) in crystal of 3.365 Å and a crystallite size Lc (002) of 800 Å.

The flaky graphite thus obtained was made into a lithium secondary battery via the same processes as in Example 1, and the battery characteristics thereof were examined in the same manner as in Example 1. The results are shown in FIG. 3 and FIG. 4.

The lithium secondary batteries obtained in Examples 1, 2 and 3 of this invention were compared with one another on occlusion and release of lithium. The results were as mentioned below. FIG. 3 is a graph illustrating the relation between discharge capacity and charge-discharge cycle number in a repeated charge-discharge test of lithium secondary battery. In FIG. 3, Curve 9 depicts the discharge capacity of the lithium secondary battery obtained in Example 1; Curve 10 expresses discharge capacity of the lithium secondary battery obtained in Example 2; and Curve 11 expresses discharge capacity of the lithium secondary battery obtained in Example 3.

In FIG. 3, the lithium secondary battery obtained in Example 1 shows a highest discharge capacity of 750 mAh, and the capacity decrease rate of the discharge capacity in the 500th cycle based on the highest capacity is 8%. The lithium secondary battery obtained in Example 2 shows a highest discharge capacity of 720 mAh, and the capacity decrease rate of the discharge capacity in the 500th cycle based on the highest capacity is 12%. The lithium secondary battery obtained in Example 3 shows a highest discharge capacity of 650 mAh, and the capacity decrease rate of the discharge capacity in the 500th cycle based on the highest capacity is 31%.

FIG. 4 illustrates the relation between charge-discharge current and discharge capacity in a rapid charge-discharge test. Curve 12 depicts discharge capacity of the lithium secondary battery obtained in Example 1; Curve 13 expresses discharge capacity of the lithium secondary battery obtained in Example 2; and Curve 14 expresses discharge capacity of the lithium secondary battery obtained in Example 3. At a charge-discharge current of 900 mA, the lithium secondary battery obtained in Example 1 shows a discharge capacity of 630 mAh and the lithium secondary battery obtained in Example 2 shows a discharge capacity of 520 mAh. On the other hand, the lithium secondary battery obtained in Example 3 shows a discharge capacity of 350 mA. At a charge-discharge current of 300 mAh, capacity decrease rate based on discharge capacity is 16% in the lithium secondary battery obtained in Example 1, 28% in that obtained in Example 2, and 46% in that obtained in Example 3.

Based on the results of tests of Examples 1, 2 and 3, it has been confirmed that the lithium secondary batteries using the first, second and third graphite particles of this invention are high in capacity and excellent in the charge-discharge cycle characteristics, and have good rapid charge-discharge characteristics.

EXAMPLE 4

Fifty parts by weight of a coke powder having a mean particle diameter of 10 μm, 20 parts by weight of tar pitch, 10 parts by weight of silicon carbide and 20 parts by weight of coal tar were mixed together and stirred at 100° C. for one hour. The mixture was calcined in an atmosphere of nitrogen at 2,800° C. and then pulverized to obtain graphite particles having a mean particle diameter of 20 μm. One hundred particles were selected therefrom at random, and mean aspect ratio thereof was measured to obtain a result of 1.5. As measured by BET method, specific surface area of the graphite particles thus obtained was 2.9 m$^2$/g. As measured by X ray broad angle diffraction, interlaminar distance d (002) of the crystal thereof was 3.360 Å, and crystallite size Lc (002) was 1,000 Å or above. According to a scanning electron microscopic photograph (SEM photograph), the graphite particles thus obtained had a structure in which a plurality of flat-shaped particles were assembled or bound together so that the planes of orientation were not parallel to one another.

Subsequently, 90% by weight of the graphite particle thus obtained was kneaded together with 10% by weight (weight of solid component) of polyvinylidene fluoride dissolved in N-methyl-2-pyrrolidone to obtain a graphite paste. The graphite paste was coated onto a rolled copper foil having a thickness of 10 μm, dried and compression-molded under a surface pressure of 490 MPa (0.5 ton/cm$^2$) to obtain a sample electrode. Thickness of graphite particle layer and density thereof were adjusted to 75 μm and 1.5 g/cm$^3$, respectively.

Figure 5:
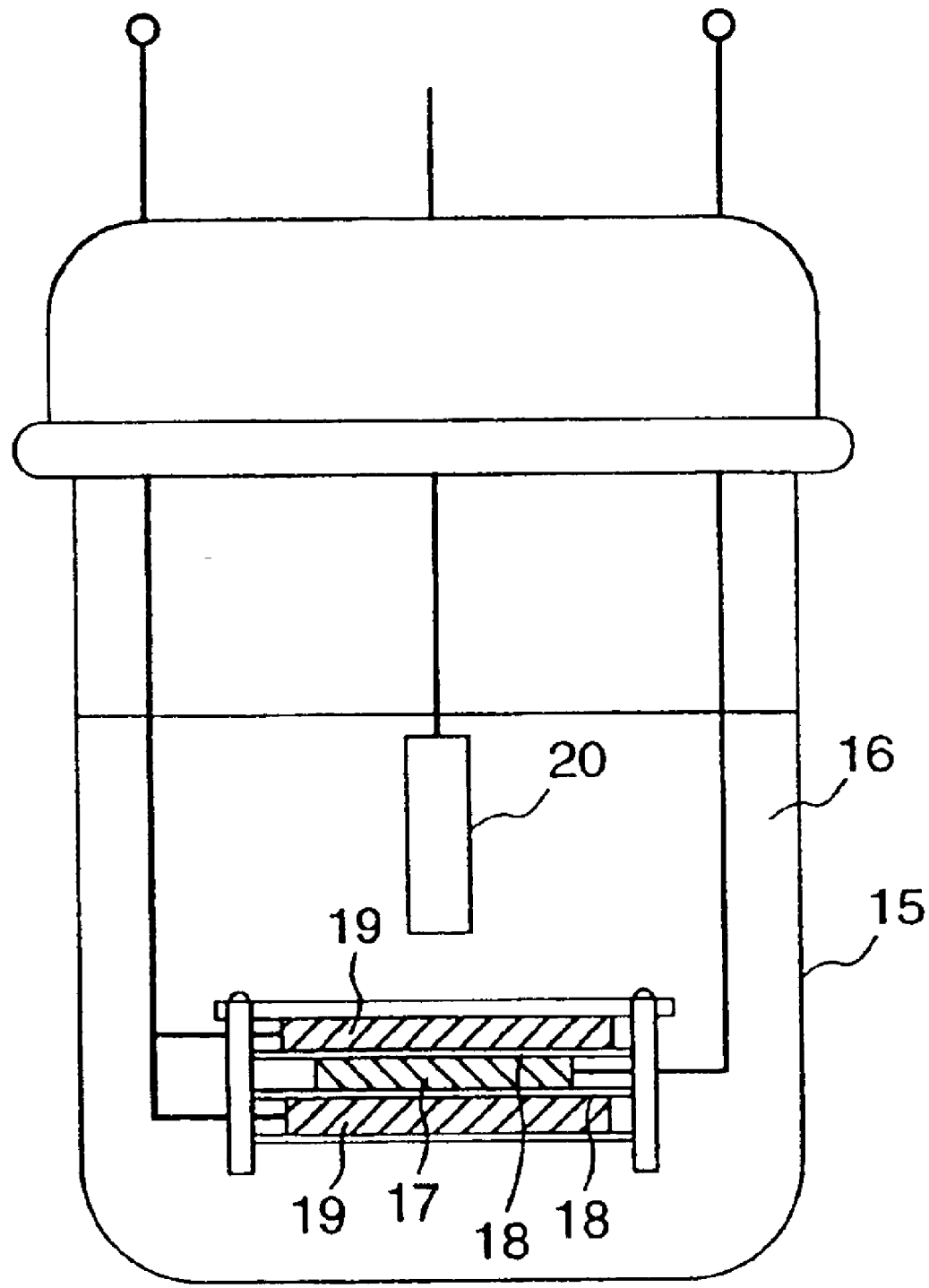
FIG. 5 is an outlined view of an example of this invention which is a lithium secondary battery used for measurement of charge-discharge characteristics and irreversible capacity.

The sample electrode thus prepared was subjected to a constant current charge-discharge test by the 3-terminals method to evaluate its performance as a negative electrode for lithium secondary battery. FIG. 5 is an outlined view of the lithium secondary battery. The sample electrode was evaluated by preparing an electrolytic solution 16 consisting of LiPF$_4$ dissolved in 1:1 (by volume) mixture of ethylene carbonate (EC) and dimethyl carbonate (DMC), concentration of LiPF$_4$ in said solution being 1 mol/liter, introducing the resulting solution into a glass cell 15 as shown in FIG. 5, laminating a sample electrode (negative electrode) 17, a separator 18 and a counter electrode (positive electrode) 19, and hanging a reference electrode 20 up-to-down to prepare a lithium secondary battery. Metallic lithium was used as the counter electrode 19 and the reference electrode 20; and a microporous polyethylene film was used as the separator 18. Using the lithium secondary battery thus obtained, charging at a constant current of 0.3 mA/cm$^2$ (per area of sample electrode) was carried out until the voltage between sample electrode 17 and counter electrode 19 reached 5 mV (Vvs. Li/Li$^+$) and then discharging was carried out until the voltage reached 1 V (Vvs. Li/Li$^+$), and this cycle was repeated to make a test. Table 1 illustrates the charge capacity per unit weight of graphite particles, the discharge capacity per unit weight of graphite particles and the irreversible capacity in the first cycle, and the discharge capacity per unit weight of graphite particles in the 50th cycle. Further, as an evaluation of the rapid charge-discharge characteristics, Table 2 illustrates the change in discharge capacity in an experiment of charging at a constant current of 0.3 mA/cm$^2$ followed by discharging at a varied discharge current of 0.3, 2.0, 4.0 and 6.0 mA/cm$^2$.

EXAMPLE 5

Fifty parts by weight of coke powder having a mean particle diameter of 10 μm, 10 parts by weight of tar pitch, 5 parts by weight of silicon carbide and 10 parts by weight of coal tar were mixed together and stirred at 100° C. for one hour. The mixture was calcined in an atmosphere of nitrogen at 2,800° C. and pulverized to obtain graphite particles having a mean particle diameter of 20 μm. One hundred particles were selected therefrom at random, and the mean value of aspect ratio was calculated to obtain a result of 4.5. As measured by BET method, specific surface area of the graphite particles thus obtained was 4.9 m$^2$/g. As measured by X ray broad angle diffraction, the inter-laminar distance d (002) of the graphite crystal was 3.362 Å, and the size of crystallite Lc (002) was 1,000 Å or above. The graphite particles obtained herein had a structure in which a plurality of flat-shaped particles were assembled or bound together so that the planes of orientation thereof were not parallel to one another.

Thereafter, the procedure of Example 4 was repeated to obtain a lithium secondary battery, which was then tested in the same manner as in Example 4. Table 1 illustrates the charge capacity per unit weight of graphite particles, the discharge capacity per unit weight of graphite particles and the irreversible capacity in the first cycle, and the discharge capacity per unit weight of graphite particles in the 50th cycle. Further, as an evaluation of rapid charge-discharge characteristics, Table 2 illustrates the change in discharge capacity in an experiment of charging at a constant current of 0.3 mA/cm$^2$ followed by discharging at a varied discharge current of 0.3, 2.0, 4.0 and 6.0 mA/cm$^2$.

EXAMPLE 6

Fifty parts by weight of a coke powder having a mean particle diameter of 10 μm, 5 parts by weight of a tar pitch and 5 parts by weight of a coal tar were mixed together and stirred at 100° C. for one hour. The mixture was calcined in an atmosphere of nitrogen at 2,800° C. and pulverized to obtain graphite particles having a mean particle diameter of 20 μm. One hundred particles were selected therefrom at random, and mean value of aspect ratio thereof was determined to obtain a result of 5. As measured by BET method, specific surface area of the graphite particle thus obtained was 6.3 m$^2$/g. As measured by X ray broad angle diffraction, the interlaminar distance d (002) of the crystal was 3.368 Å, and the size of crystallite Lc (002) was 700 Å. The graphite particles thus obtained had a structure in which a plurality of flat-shaped particles were assembled or bound together so that the planes of orientation were not parallel to one another.

Thereafter, the procedure of Example 4 was repeated to prepare a lithium secondary battery, and it was tested in the same manner as in Example 4. Table 1 illustrates the charge capacity per unit weight of graphite particles, the discharge capacity per unit weight of graphite particles and the irreversible capacity in the first cycle, and the discharge capacity per unit weight of graphite particles in the 50th cycle. Further, as an evaluation of rapid charge-discharge characteristics, Table 2 illustrates the change in discharge capacity in an experiment of charging at a constant current of 0.3 mA/cm$^2$ followed by discharging at a varied discharge current of 0.3, 2.0, 4.0 and 6.0 mA/cm$^2$.

EXAMPLE 7

A coke powder having a mean particle diameter of 22 μm was calcined in an atmosphere of nitrogen at 2,800° C. to obtain graphite particles having a mean particle diameter of 20 μm. The graphite particles thus obtained constituted a flaky graphite having a mean aspect ratio of 7 and a specific surface area of 8.5 m$^2$/g as measured by BET method. The interlaminar distance d (002) of the crystal was 3.368 Å and crystallite size Lc (002) was 800 Å, as measured by X ray broad angle diffraction.

The procedure of Example 4 was repeated to obtain a lithium secondary battery, and the battery performance was examined in the same manner as in Example 4. Table 1 illustrates the charge capacity per unit weight of graphite particles, the discharge capacity per unit weight of graphite particles and the irreversible capacity in the first cycle, and the discharge capacity per unit weight of graphite particles in the 50th cycle. Further, as an evaluation of rapid charge-discharge characteristics, Table 2 illustrates the change in discharge capacity in an experiment of charging at a constant current of 0.3 mA/cm$^2$ followed by discharging at a varied discharge current of 0.3, 2.0, 4.0 and 6.0 mA/cm$^2$.

TABLE 2

|  |  | Example 4 | Example 5 | Example 6 | Example 7 |
|---|---|---|---|---|---|
| Charge capacity (mAh/g) | At a discharge current of: 0.3 mA/cm$^2$ | 335 | 325 | 302 | 294 |
|  | 2.0 mA/cm$^2$ | 330 | 319 | 288 | 280 |
|  | 4.0 mA/cm$^2$ | 312 | 292 | 245 | 219 |
|  | 6.0 mA/cm$^2$ | 280 | 220 | 180 | 105 |

TABLE 1

|  |  | Example 4 | Example 5 | Example 6 | Example 7 |
|---|---|---|---|---|---|
| First cycle | Charge capacity (mAh/g) | 370 | 375 | 363 | 366 |
|  | Discharge capacity (mAh/g) | 335 | 325 | 302 | 294 |
|  | Irreversible capacity (%) | 9.5 | 13.3 | 16.8 | 19.7 |
| Discharge capacity of the 50th cycle (mAh/g) |  | 320 | 300 | 265 | 220 |

It is apparent from Tables 1 and 2 that the lithium secondary batteries using the first, second and third graphite particles of this invention are higher in discharge capacity, smaller in the irreversible capacity of the first cycle and more excellent in cycle characteristics and rapid charge-discharge characteristics than that of Example 7.

In Examples 8 to 11 presented below, there are studied the use of the fourth graphite particle of this invention as a graphite particle, and the use of the first negative electrode material for lithium secondary battery of this invention as a negative electrode material for lithium secondary battery.

EXAMPLE 8

(1) Preparation of Graphite Particles

Fifty parts by weight of coke powder having a mean particle diameter of 10 μm, 20 parts by weight of tar pitch, 12 parts by weight of iron oxide having a mean particle diameter of 65 μm and 18 parts by weight of coal tar were mixed together and stirred at 200° C. for one hour. The mixture was calcined first at 800° C. and then at 2,800° C. in an atmosphere of nitrogen, and pulverized to obtain graphite particles having a mean particle diameter of 20 μm. According to a scanning electron microscopic photograph (SEM photograph) of the graphite particles thus obtained, the graphite particle had a structure in which a plurality of flat-shaped particles were assembled or bound together so that the planes of orientation were not parallel to one another. On hundred particles were selected at random, and mean value of aspect ratio was calculated to obtain a result of 1.7. As measured by X ray broad angle diffraction of the graphite particles, the interlaminar distance d (002) of the crystal was 3.360 Å, and the crystallite size in the direction of plane La (110) was 720 Å and the crystallite size in the c-axis direction Lc (002) was 1,800 Å.

(2) Preparation of Lithium Secondary Battery

The lithium secondary battery shown in FIG. 2 was prepared in the following manner. A paste of a mixture for forming a positive electrode was prepared by using 88% by weight of $LiCoO_2$ as a positive electrode active material, 7% by weight of flaky natural graphite having a mean particle diameter of 1 μm as an electroconductive material and 5% by weight of polyvinylidene fluoride (PVDF) as a binder, adding thereto N-methyl-2-pyrrolidone and homogenizing the mixture. Similarly, a paste of a mixture for forming a negative electrode was prepared by using 90% by weight of the graphite powder obtained in (1) as a negative electrode active material and 10% by weight of PVDF as a binder, adding N-methyl-2-pyrrolidone, and homogenizing the mixture.

Subsequently, the paste of the mixture for forming a positive electrode obtained above was coated onto both sides of an aluminum foil having a thickness of 25 μm and vacuum-dried at 120° C. for one hour. After dryness, press-molding using a roller press was carried out to adjust the thickness to 190 μm. The coating amount of the mixture for forming a positive electrode per unit area was 49 mg/m². Cutting into a size of 40 mm (width)×285 mm (length) gave positive electrode 1, provided that both terminal portions, each having a length of 10 mm, of the positive electrode 1 were not coated with the mixture for forming a positive electrode, so that the aluminum foil was exposed there. A positive electrode tab 4 was contact-bonded to one of the terminal portions by the method of ultrasonic bonding.

On the other hand, the paste of the mixture for forming a negative electrode obtained above was coated on both sides of a copper foil having a thickness of 10 μm and then vacuum-dried at 120° C. for one hour. After dryness, an electrode was formed by press-molding by means of a roller press and thickness was adjusted to 175 μm. The coating amount of the mixture for forming a negative electrode per unit area was 20 mg/cm². Cutting into a size of 40 mm (width)×290 mm (length) gave a negative electrode 2. Like in the positive electrode 1, both terminal portions each having a length of 10 mm of the negative electrode 2 thus obtained were not coated with the mixture for forming a negative electrode, so that copper foil was exposed there. A negative electrode tab 5 was contact-bonded to one of these portions by the method of ultrasonic bonding.

As the separator 3, a micro-porous film made of polyethylene having a thickness of 25 μm and a width of 44 mm was used. Subsequently, as shown in FIG. 1, positive electrode 1, separator 3, negative electrode 2 and separator 3 were successively superposed and rolled up to form an electrode group. The electrode group was inserted into a Single-3 size battery can 7, a negative tab 5 was bonded to the can bottom by welding, and a squeezed portion was provided for caulking a positive electrode lid 6. Then, an electrolytic solution (not shown in drawing) prepared by dissolving 1 mol/liter of lithium hexafluoro-phosphate in 1:1 mixture of ethylene carbonate and dimethyl carbonate was poured into the battery can 7, a positive electrode tab 4 was bonded to the positive electrode lid 6, and then positive electrode lid 6 was caulked to obtain a lithium secondary battery.

Using the lithium secondary battery obtained above, a charge-discharge test was repeatedly carried out at a charge-discharge current of 300 mA, a final charge voltage of 4.15 V and a final discharge voltage of 2.8 V. Further, a rapid charge-discharge test was carried out while changing the charge-discharge current in the range of 300 mA to 600 mA, and the discharge capacity per unit weight of graphite particles in the first cycle and the maintenance rate of discharge capacity per unit weight of graphite particles in the 100th cycle were measured. The results are shown in Table 3.

EXAMPLE 9

Fifty five parts by weight of coke powder having a mean particle diameter of 10 μm, 22 parts by weight of tar pitch, 8 parts by weight of boron nitride having a mean particle diameter of 25 μm and 15 parts by weight of coal tar were mixed together and stirred at 200° C. for one hour. The mixture was calcined first at 800° C. and then at 2,800° C. in an atmosphere of nitrogen and pulverized to obtain graphite particles having a mean particle diameter of 20 μm. According to a scanning electron microscopic photograph (SEM photograph), the graphite particles thus obtained had a structure in which flat-shaped particles were assembled or bound together so that the planes of orientation were not parallel to one another. One hundred particles were selected at random, and mean value of aspect ratio was calculated to obtain a result of 1.5. According to X ray broad angle diffraction of the graphite particles thus obtained, the interlaminar distance d (002) of the crystal was 3.363 Å, and the crystallite size in the plane direction La (110) was 560 Å and crystallite size in the c-axis direction Lc (002) was 1,760 Å.

A lithium secondary battery was prepared from the graphite particles thus obtained by the same procedure as in Example 8, and battery characteristics thereof were examined in the same manner as in Example 8. The results are shown in Table 3.

EXAMPLE 10

Fifty seven parts by weight of coke powder having a mean particle diameter of 15 μm, 23 parts by weight of tar pitch and 20 parts by weight of coal tar were mixed together and stirred at 200° C. for one hour. The mixture was calcined first at 800° C. in an atmosphere of nitrogen and then at 2,600° C. in an atmosphere of nitrogen, and pulverized to obtain graphite particles having a mean particle diameter of 20 μm. According to a scanning electron microscopic photograph, the graphite particles thus obtained had a structure in which a plurality of flat-shaped particles were assembled or bound together so that the planes of orientation were not parallel to one another. One hundred particles were selected at random, and mean value of aspect ratio thereof was measured to obtain a result of 2.0. According to X ray broad angle diffraction of the graphite particles thus obtained, the interlaminar distance d (002) of the crystal was 3.390 Å, and the crystallite size in the plane direction La (110) was 460 Å and crystallite size in the c-axis direction Lc (002) was 300 Å.

A lithium secondary battery was prepared from the graphite particles thus obtained by the same procedure as in Example 8, and battery characteristics thereof were examined in the same manner as in Example 9. The results are shown in Table 3.

EXAMPLE 11

Graphite particles having a mean particle diameter of 20 μm were prepared by repeating the procedure of Example 10, except that the calcination was carried out at 3,000° C. According to a scanning electron microscopic photograph, the graphite particles thus obtained had a structure in which a plurality of flat-shaped particles were assembled or bound together so that the planes of orientation were not parallel to one another. One hundred particles were selected at random, and mean value of aspect ratio thereof was measured to obtain a result of 2.2. According to X ray broad angle diffraction of the graphite particles thus obtained, the interlaminar distance d (002) of the crystal was 3.357 Å, and the crystallite size in the plane direction La (110) was 1,730 Å and crystallite size in the c-axis direction Lc (002) was 2,050 Å.

A lithium secondary battery was prepared from the graphite particles thus obtained by the same procedure as in Example 8, and battery characteristics thereof were examined in the same manner as in Example 1. The results are shown in Table 3.

TABLE 3

| | | Example 8 | Example 9 | Example 10 | Example 11 |
|---|---|---|---|---|---|
| Charge-discharge voltage 300 (mA) | Discharge capacity (mAh) | 722 | 688 | 467 | 730 |
| | Maintenance of discharge capacity in the 100th cycle (%) | 81 | 80 | 70 | 78 |
| Charge-discharge voltage 600 (mA) | Discharge capacity (mAh) | 688 | 669 | 359 | 380 |
| | Maintenance of discharge capacity in the 100th cycle | 79 | 78 | 64 | 66 |

It is apparent from Table 3 that the lithium secondary batteries using the fourth graphite particle of this invention show a high discharge capacity at a charge-discharge current of 300 mA and retain 70% or more of the high discharge capacity even at an enhanced charge-discharge current of 600 mA, exhibiting excellent rapid charge-discharge characteristics.

In Examples 12 to 15, there are studied the use of the fifth and sixth graphite particles of this invention as a graphite particle and the use of the first negative electrode material for lithium secondary battery of this invention as a negative electrode material for lithium secondary battery.

EXAMPLE 12

Forty parts by weight of a coke powder having a mean particle diameter of 5 μm, 25 parts by weight of tar pitch, 5 parts by weight of silicon carbide having a mean particle diameter of 48 μm and 20 parts by weight of coal tar were mixed together and stirred at 200° C. for one hour. The mixture was calcined at 2,800° C. in an atmosphere of nitrogen and pulverized to obtain graphite particles having a mean particle diameter of 30 μm. Using Shimadzu Poresizer 9320, pore size distribution of the graphite particles thus obtained was measured by the mercury porosimeter method to find that the pore size covered a range of $10^2$ to $10^6$ Å, and the total pore volume per weight of graphite particle was 0.6 cc/g. Further, the pore volume of the pores having a pore size of $1 \times 10^2$ to $2 \times 10^4$ Å A was 0.20 cc/g per weight of graphite particles. One hundred particles were selected at random, and mean value of aspect ratio thereof was measured to obtain a result of 1.5. As measured by BET method, the specific surface area of graphite particles was 1.5 m²/g. As measured by X ray broad angle diffraction of the graphite particles, the interlaminar distance d (002) of the crystal was 3.362 Å, and the crystallite size Lc (002) was 1,000 Å or above. Further, according to a scanning electron microscopic photograph (SEM photograph), the graphite particles had a structure in which a plurality of flat-shaped particles were assembled or bound together so that the planes of orientation were not parallel to one another.

Subsequently, a graphite paste was prepared by kneading 90% by weight of the graphite particles obtained above together with 10% by weight, as expressed by weight of solid component, of a solution of polyvinylidene fluoride (PVDF) in N-methyl-2-pyrrolidone. The graphite paste was coated onto a rolled copper foil having a thickness of 10 μm, dried, and compression-molded under a surface pressure of 490 MPa (0.5 ton/cm²) to obtain a sample electrode. Thickness of the graphite layer and density were adjusted to 90 μm and 1.6 g/cm³, respectively.

The sample electrode thus obtained was subjected to a constant current charge-discharge test by the 3-terminals method for the purpose of evaluation as a negative electrode for lithium secondary battery. FIG. 5 is an outlined view of the lithium secondary battery. Evaluation of the sample electrode was carried out as shown in FIG. 5 by introducing, into glass cell 1, a 1 mol/liter solution of $LiPF_6$ in 1:1 (by volume) mixture of ethylene carbonate (EC) and dimethyl carbonate (DMC) as an electrolytic solution 2, disposing a laminate of sample electrode 3, separate 4 and counter electrode 5, and hanging a reference electrode 6 up-to-down to form a lithium secondary battery. As the counter electrode 5 and reference electrode 6, metallic lithium was used. As the separator 4, a micro-porous polyethylene film was used. Using the lithium secondary battery thus obtained, charging at a constant current of 0.5 mA/cm² (per area of sample electrode) was carried out until the voltage between sample electrode 3 and counter electrode 5 reached 5 mV (Vvs. Li/Li⁺) and then discharging was carried out until the voltage reached 1 V (Vvs. Li/Li⁺), and this cycle was repeated to make a test. Table 4 illustrates the charge capacity and discharge capacity per unit weight of graphite particles in the first cycle, and the discharge capacity per unit weight of graphite particles in the 30th cycle.

EXAMPLE 13

Fifty parts by weight of a coke powder having a mean particle diameter of 20 µm, 20 parts by weight of pitch, 7 parts by weight of silicon carbide having a mean particle diameter of 48 µm and 10 parts by weight of coal tar were mixed together and stirred at 200° C. for one hour. The mixture was calcined at 2,800° C. in an atmosphere of nitrogen and pulverized to obtain graphite particles having a mean particle diameter of 30 µm. A pore size distribution measurement by the mercury porosimeter method using Shimadzu Poresizer 9320 revealed that the graphite particles thus obtained had pores covering a range of $10^2$ to $10^6$ Å, and the total pore volume per weight of graphite particles was 1.5 cc/g. The pore volume of pores having a size falling in the range of $1\times10^2$ to $2\times10^4$ Å was 0.13 cc/g per weight of graphite particles. One hundred graphite particles were selected therefrom at random and the mean value of aspect ratio was measured to obtain a result of 2.3. As measured by BET method, specific surface area of the graphite particles was 3.6 m$^2$/g. As measured by X ray broad angle diffraction of the graphite particles, interlaminar distance d (002) of the crystal was 3.361 Å, and the crystallite size Lc (002) was 1,000 Å or above. The graphite particles thus obtained had a structure in which a plurality of flat-shaped particles were assembled or bound together so that the planes of orientation were not parallel to one another.

Thereafter, a lithium secondary battery was prepared by the same procedure as in Example 12, and tested in the same manner as in Example 12. Table 4 illustrates the charge capacity and discharge capacity per unit weight of graphite particles in the first cycle and the discharge capacity per unit weight of graphite particles in the 30th cycle.

EXAMPLE 14

Meso Carbon Microbeads (manufactured by Kawasaki Steel Corporation, trade name KMFC) was calcined in an atmosphere of nitrogen at 2,800° C. to obtain graphite particles having a mean particle diameter of 25 µm. Using Shimadzu Poresizer 9320, pore size distribution of the graphite particles thus obtained was determined by mercury porosimeter method. As a result, the graphite had pores covering a range of $10^2$ to $10^6$ Å, and the total pore volume per weight of graphite particles was 0.35 cc/g. The pore volume of the pores having a size falling in the range of $1\times10^2$ to $2\times10^4$ Å was 0.06 cc/g per weight of graphite particles. One hundred graphite particles were selected therefrom at random, and mean value of aspect ratio was measured to obtain a result of 1. As measured by BET method, specific surface area of the graphite particles was 1.4 m$^2$/g. As measured by X ray broad angle diffraction of the graphite particles, the interlaminar distance d (002) of the crystal was 3.378 Å and the crystallite size Lc (002) was 500 Å.

A lithium secondary battery was prepared by repeating the procedure of Example 12, and tested in the same manner as in Example 12. Table 4 illustrates the charge capacity and discharge capacity per unit weight of the graphite particles in the first cycle, and the discharge capacity per unit weight of the graphite particles in the 30th cycle.

EXAMPLE 15

Fifty parts by weight of coke powder having a mean particle diameter of 5 µm, 10 parts by weight of pitch, 30 parts by weight of iron oxide having a mean particle diameter of 65 µm and 20 parts by weight of coal tar were mixed together and stirred at 200° C. for one hour. The mixture was calcined at 2,800° C. in an atmosphere of nitrogen and then pulverized to obtain graphite particles having a mean particle diameter of 15 µm. Using Shimadzu Poresizer 9320, pore size distribution of the graphite particles thus obtained was determined by the mercury porosimeter method to reveal that the graphite particles had pores covering a range of $10^2$ to $10^6$ Å, the total pore volume per unit weight of graphite particles was 2.1 cc/g, and the pore volume of the pores having a size falling in the range of $1\times10^2$ to $2\times10^4$ Å was 0.42 cc/g per weight of graphite particles. One hundred particles were selected therefrom at random, and mean value of aspect ratio was measured to obtain a result of 2.8. As measured by BET method, specific surface area of the graphite particles was 8.3 m$^2$/g. As measured by X ray broad angle diffraction of graphite particles, the interlaminar distance d (002) of the crystal was 3.365 Å, and the crystallite size Lc (002) was 1,000 Å or above.

Subsequently, a lithium secondary battery was prepared by the same procedure as in Example 12 and tested in the same manner as in Example 12. Table 4 illustrates charge capacity and discharge capacity per unit weight of the graphite particles in the first cycle, and the charge capacity per unit weight of graphite particles in the 30th cycle.

TABLE 4

|  | Example 12 | Example 13 | Example 14 | Example 15 |
|---|---|---|---|---|
| Charge capacity in the first cycle (mAh/g) | 392 | 380 | 321 | 384 |
| Discharge capacity in the first cycle (mAh/g) | 353 | 345 | 288 | 338 |
| Discharge capacity in the 30th cycle (mAh/g) | 346 | 338 | 159 | 286 |

It is apparent from Table 4 that the lithium secondary batteries using the fifth and sixth graphite particles of this invention have a high capacity and are excellent in cycle characteristics.

In Examples 16 to 21, there are studied the use of the second negative electrode material for lithium secondary battery of this invention as a negative electrode material for lithium secondary battery.

EXAMPLE 16

Fifty parts by weight of coke powder having a mean particle diameter of 8 µm, 20 parts by weight of tar pitch, 5 parts by weight of silicon carbide and 15 parts by weight of coal tar were mixed together and stirred at 100° C. for one hour. The mixture was calcined at 2,800° C. in an atmosphere of nitrogen and pulverized to obtain graphite particles having a mean particle diameter of 25 µm. One hundred particles were selected therefrom at random and the mean value of aspect ratio was measured to obtain a result of 1.5. As measured by BET method, specific surface area of the graphite particles was 2.1 m$^2$/g. As measured by X ray broad angle diffraction of the graphite particles, interlaminar distance d (002) of the crystal was 3.365 Å, and the crystallite size Lc (002) was 1,000 Å or above. The graphite particles thus obtained had a structure in which a plurality of flat-shaped particles were assembled or bound together so that the planes of orientation were not parallel to one another.

Subsequently, a graphite paste was prepared by kneading 90% by weight of the graphite particles obtained above together with 10% by weight, as expressed by weight of solid component, of a solution of polyvinylidene fluoride (PVDF) in N-methyl-2-pyrrolidone. The graphite paste was coated onto a rolled copper foil having a thickness of 10 μm, dried to remove the N-methyl-2-pyrrolidone, and compressed under a pressure of 30 MPa to obtain a sample electrode. Thickness of the graphite-PVDF mixture layer and density were adjusted to 80 μm and 1.55 g/cm$^3$, respectively. The sample electrode thus obtained was subjected to a constant current charge-discharge test by the 3-terminals method for the purpose of evaluation as a negative electrode for lithium secondary battery. FIG. 5 is an outlined view of the lithium secondary battery. Evaluation of the sample electrode was carried out as shown in FIG. 5 by introducing, into glass cell 1, a 1 mol/liter solution of LiPF$_6$ in 1:1 (by volume) mixture of ethylene carbonate (EC) and dimethyl carbonate (DMC) as an electrolytic solution 2, disposing a laminate of sample electrode 3, separate 4 and counter electrode 5, and hanging a reference electrode 6 up-to-down to form a lithium secondary battery. As the counter electrode 5 and reference electrode 6, metallic lithium was used. As the separator 4, a micro-porous polyethylene film was used. Using the lithium secondary battery thus obtained, charging was carried out at a constant current of 0.2 mA/cm$^2$ (per area of the graphite particle-PVDF mixture in sample electrode) until the voltage between sample electrode 3 and counter electrode 5 reached 5 mV (Vvs. Li/Li$^+$) and discharging was carried out until the voltage reached 1 V (Vvs. Li/Li$^+$). Although this cycle was repeated 50 times to make a test, no decrease in discharge capacity was noticeable. Further, as an evaluation of rapid charge-discharge characteristics, charging was carried out at a constant current of 0.3 mA/cm$^2$ and then discharging was carried out at a varied discharging current of 0.5, 2.0, 4.0 and 6.0 mA/cm$^2$. The relation between discharge capacity and volume of graphite particle-PVDF mixture is shown in Table 5.

EXAMPLE 17

A sample electrode was prepared by repeating the procedure of Example 16, except that the compression force under press was altered to 40 MPa. In the sample electrode thus obtained, thickness of the graphite particle-PVDF mixture was 80 μm, and density thereof was 1.63 g/cm$^3$.

Subsequently, a lithium secondary battery was prepared by repeating the procedure of Example 16, and a test was carried out in the same manner as in Example 16. As a result, no decrease in discharge capacity was noticeable. Further, as an evaluation of rapid charge-discharge characteristics, charging was carried out at a constant current of 0.3 mA/cm$^2$ and then discharging was carried out at a varied discharge current of 0.5, 2.0, 4.0 and 6.0 mA/cm$^2$. The discharge capacities were as shown in Table 5.

EXAMPLE 18

A sample electrode was prepared by the same processes as in Example 1, except that the compression force of press was altered to 80 MPa. In the sample electrode thus obtained, thickness of the mixture of graphite particles and PVDF was 80 μm and density thereof was 1.75 g/cm$^3$.

Subsequently, a lithium secondary battery was prepared by the same processes as in Example 16, and tested in the same manner as in Example 16. As a result, no decrease in discharge capacity was observed. For evaluating the rapid charge-discharge characteristics, charging was carried out at a constant current of 0.3 mA/cm$^2$ and discharging was carried out at a varied discharge current of 0.5, 2.0, 4.0 and 6.0 mA/cm$^2$. The discharge capacities were as shown in Table 5.

EXAMPLE 19

A sample electrode was prepared by the same procedure as in Example 16, except that the compression force of press was altered to 100 MPa. In the sample electrode thus obtained, thickness of the mixture of graphite particles and PVDF was 80 μm and density thereof was 1.85 g/cm$^3$.

Subsequently, a lithium secondary battery was prepared by the same procedure as in Example 16, and tested in the same manner as in Example 16. As a result, no decrease in discharge capacity was observed. For evaluating the rapid charge-discharge characteristics, charging was carried out at a constant current of 0.3 mA/cm$^2$ and discharging was carried out at a varied discharge current of 0.5, 2.0, 4.0 and 6.0 mA/cm$^2$. The discharge capacities were as shown in Table 5.

EXAMPLE 20

A sample electrode was prepared by the same procedure as in Example 16, except that the compression force of press was altered to 20 MPa. In the sample electrode thus obtained, thickness of the mixture of graphite particles and PVDF was 80 μm and density thereof was 1.45 g/cm$^3$.

Subsequently, a lithium secondary battery was prepared by the same procedure as in Example 16, and tested in the same manner as in Example 16. As a result, no decrease in discharge capacity was observed. For evaluating the rapid charge-discharge characteristics, charging was carried out at a constant current of 0.3 mA/cm$^2$ and discharging was carried out at a varied discharge current of 0.5, 2.0, 4.0 and 6.0 mA/cm$^2$. The discharge capacities were as shown in Table 5.

EXAMPLE 21

A sample electrode was prepared by the same procedure as in Example 16, except that the compression force of press was altered to 140 MPa. In the sample electrode thus obtained, thickness of the mixture of graphite particles and PVDF was 80 μm and density thereof was 1.93 g/cm$^3$.

Subsequently, a lithium secondary battery was prepared by the same procedure as in Example 16, and tested in the same manner as in Example 16. As a result, a 15.7% decrease of discharge capacity was observed. For evaluating the rapid charge-discharge characteristics, charging was carried out at a constant current of 0.3 mA/cm$^2$ and discharging was carried out at a varied discharge current of 0.5, 2.0, 4.0 and 6.0 mA/cm$^2$. The discharge capacities were as shown in Table 5.

TABLE 5

|  |  | Example 16 | Example 17 | Example 18 | Example 19 | Example 20 | Example 21 |
|---|---|---|---|---|---|---|---|
| Density of graphite particle/organic binder mixture (g/cm$^3$) | | 1.55 | 1.63 | 1.75 | 1.85 | 1.45 | 1.93 |
| Discharge capacity (mAh/cm$^2$) | At a discharge current of: 0.5 mA/cm$^2$ | 542 | 562 | 570 | 587 | 509 | 527 |
| | 2.0 mA/cm$^2$ | 524 | 546 | 553 | 566 | 493 | 481 |
| | 4.0 mA/cm$^2$ | 500 | 522 | 528 | 512 | 473 | 416 |
| | 6.0 mA/cm$^2$ | 468 | 484 | 478 | 470 | 442 | 360 |

As shown in Table 5, it is apparent that the lithium secondary batteries using the second negative electrode for lithium secondary battery of this invention are high in discharge capacity and excellent in rapid charge-discharge characteristics.

In Examples 22 to 29, there is studied a use of the third negative electrode material for lithium secondary battery of this invention as a negative electrode material for lithium secondary battery.

EXAMPLE 22

Fifty parts by weight of coke powder having a mean particle diameter of 10 μm, 20 parts by weight of tar pitch, 5 parts by weight of silicon carbide and 15 parts by weight of coal tar were mixed together and stirred at 100° C. for one hour. The mixture was calcined in an atmosphere of nitrogen at 3,000° C. and pulverized to obtain graphite particles having a mean particle diameter of 25 μm. One hundred particles were selected therefrom at random, and mean value of aspect ratio was measured to obtain a result of 1.3. As measured by BET method, specific surface area of the graphite particles thus obtained was 1.9 m$^2$/g. As measured by X ray broad angle diffraction of the graphite particles, the interlaminar distance d (002)of the crystal was 3.36 Å, and the crystallite size Lc (002) was 1,000 Å or above. Further, according to a scanning electron microscopic photograph (SEM photograph) of the graphite particles thus obtained, the graphite particles had a structure in which a plurality of flat-shaped particles were assembled or bound together so that the planes of orientation were not parallel to one another.

Subsequently, 89% by weight of the graphite particles thus obtained was kneaded together with 11% by weight, as expressed by the weight of solid component, of a solution of polyvinylidene fluoride (PVDF) in N-methyl-2-pyrrolidone to obtain a graphite paste. The graphite paste was coated onto a rolled copper foil having a thickness of 10 μm, dried, and compressed by means of rollers to obtain a sample electrode in which thickness of the graphite particle-PVDF mixture was 80 μm and density thereof was 1.5 g/cm$^3$.

The sample electrode thus prepared was subjected to a constant current charge-discharge test by 3-terminals method to evaluate its performance as a negative electrode for lithium secondary battery. FIG. 5 is an outlined view of the lithium secondary battery. The sample electrode was evaluated by preparing an electrolytic solution 2 consisting of LiPF dissolved in 1:1 (by volume) mixture of ethylene carbonate (EC) and dimethyl carbonate (DMC) so that concentration of said solution came to 1 mol/liter, introducing the resulting solution into a glass cell 1 as shown in FIG. 5, laminating a sample electrode 3, a separator 4 and a counter electrode 5, and hanging a reference electrode 6 up-to-down to prepare a lithium secondary battery. Metallic lithium was used as the counter electrode 5 and the reference electrode 6; and a micro-porous polyethylene film was used as the separator 4. Using the lithium secondary battery thus obtained, charging at a constant current of 0.3 mA/cm$^2$ (per area of graphite particle-PVDF mixture in the sample electrode) was carried out until the voltage between sample electrode 3 and counter electrode 5 reached 5 mV (Vvs. Li/Li$^+$) and then discharging was carried out at a constant current of 0.3 mA/cm$^2$ until the voltage reached 1 V (Vvs. Li/Li$^+$), and this cycle was repeated to make a test. Table 6 illustrates the discharge capacity per unit weight of graphite particles, the discharge capacity per unit weight of graphite particle-PVDF mixture, and the discharge capacity per unit weight of graphite particle-PVDF mixture in the 50th cycle. Further, as an evaluation of the rapid charge-discharge characteristics, Table 6 also illustrates the discharge capacity in an experiment of charging at a constant current of 0.3 mA/cm$^2$ followed by discharging at a current of 3.0 mA/cm$^2$.

EXAMPLE 23

A graphite paste was prepared by kneading 87% by weight of the graphite particles obtained in Example 22 together with 13% by weight, as expressed by the weight of solid component, of polyvinylidene fluoride (PVDF) dissolved in N-methyl-2-pyrrolidone. Thereafter, the procedure of Example 22 was repeated to obtain a sample electrode in which thickness of the graphite particle-PVDF mixture layer was 80 μm and density thereof was 1.5 g/cm$^3$.

Then, a lithium secondary battery was prepared by the same procedure as in Example 22, and tested in the same manner as in Example 22. The results are shown in Table 6.

EXAMPLE 24

A graphite paste was prepared by kneading 85% by weight of the graphite particles obtained in Example 22 together with 15% by weight, as expressed by the weight of solid component, of polyvinylidene fluoride (PVDF) dissolved in N-methyl-2-pyrrolidone. Thereafter, the procedure of Example 22 was repeated to obtain a sample electrode in which thickness of the graphite particle-PVDF mixture layer was 80 μm and density thereof was 1.5 g/cm$^3$.

Then, a lithium secondary battery was prepared by the same procedure as in Example 22, and tested in the same manner as in Example 22. The results are shown in Table 6.

EXAMPLE 25

A graphite paste was prepared by kneading 82% by weight of the graphite particles obtained in Example 22 together with 18% by weight, as expressed by the weight of solid component, of polyvinylidene fluoride (PVDF) dissolved in N-methyl-2-pyrrolidone. Thereafter, the procedure of Example 22 was repeated to obtain a sample electrode in which thickness of the graphite particle-PVDF mixture layer was 80 μm and density thereof was 1.5 g/cm³.

Then, a lithium secondary battery was prepared by the same procedure as in Example 22, and tested in the same manner as in Example 22. The results are shown in Table 6.

EXAMPLE 26

A graphite paste was prepared by kneading 80% by weight of the graphite particles obtained in Example 22 together with 20% by weight, as expressed by the weight of solid component, of polyvinylidene fluoride (PVDF) dissolved in N-methyl-2-pyrrolidone. Thereafter, the procedure of Example 22 was repeated to obtain a sample electrode in which thickness of the graphite particle-PVDF mixture layer was 80 μm and density was 1.5 g/cm³.

Then, a lithium secondary battery was prepared by the same procedure as in Example 22, and tested in the same manner as in Example 22. The results are shown in Table 6.

EXAMPLE 27

A graphite paste was prepared by kneading 92% by weight of the graphite particles obtained in Example 22 together with 8% by weight, as expressed by the weight of solid component, of polyvinylidene fluoride (PVDF) dissolved in N-methyl-2-pyrrolidone. Thereafter, the procedure of Example 22 was repeated to obtain a sample electrode in which thickness of the graphite particle-PVDF mixture layer was 80 μm and density thereof was 1.5 g/cm³.

Then, a lithium secondary battery was prepared by the same procedure as in Example 22, and tested in the same manner as in Example 22. The results are shown in Table 6.

EXAMPLE 28

A graphite paste was prepared by kneading 97.5% by weight of the graphite particles obtained in Example 22 together with 2.5% by weight, as expressed by the weight of solid component, of polyvinylidene fluoride (PVDF) dissolved in N-methyl-2-pyrrolidone. Thereafter, the procedure of Example 22 was repeated to obtain a sample electrode in which thickness of the graphite particle-PVDF mixture layer was 80 μm and density was 1.5 g/cm³.

Then, a lithium secondary battery was prepared by the same procedure as in Example 22, and tested in the same manner as in Example 22. The results are shown in Table 6.

EXAMPLE 29

A graphite paste was prepared by kneading 78% by weight of the graphite particles obtained in Example 22 together with 22% by weight, as expressed by the weight of solid component, of polyvinylidene fluoride (PVDF) dissolved in N-methyl-2-pyrrolidone. Thereafter, the procedure of Example 22 was repeated to obtain a sample electrode in which thickness of the graphite particle-PVDF mixture layer was 80 μm and density thereof was 1.5 g/cm³.

Then, a lithium secondary battery was prepared by the same procedure as in Example 22, and tested in the same manner as in Example 22. The results are shown in Table 6.

TABLE 6

|  | Example 22 | Example 23 | Example 24 | Example 25 | Example 26 | Example 27 | Example 28 | Example 29 |
|---|---|---|---|---|---|---|---|---|
| Content of PVDF (%) based on graphite particle/PVDF (organic binder) mixture | 10 | 13 | 15 | 18 | 20 | 8 | 2.5 | 22 |
| Discharge capacity (mAh/g) per unit weight of graphite particles (at discharge current of 0.3 mA/cm²) | 325 | 338 | 355 | 359 | 363 | 320 | 275 | 335 |
| Discharge capacity (mAh/g) per unit weight of graphite particle/PVDF mixture (at discharge current of 0.3 mA/cm²) | 293 | 294 | 302 | 294 | 290 | 294 | 267 | 261 |
| Discharge capacity (mAh/g) per unit weight of graphite particle/PVDF mixture in the 50th cycle (at discharge current of 0.3 mA/cm²) | 287 | 290 | 295 | 292 | 286 | 265 | 134 | 252 |
| Discharge capacity (mAh/g) per unit weight of graphite particle/PVDF mixture (at discharge current of 3.0 mA/cm²) | 267 | 282 | 280 | 278 | 271 | 250 | 160 | 232 |

As shown in Table 6, it is apparent that the third lithium secondary battery of this invention is high in capacity and excellent in rapid charge-discharge characteristics and cycle characteristics.

INDUSTRIAL APPLICABILITY

The graphite particles of this invention are suitable for use in lithium secondary batteries excellent in rapid charge-discharge characteristics and cycle characteristics.

Further, the graphite particles of this invention are suitable for use in lithium secondary batteries small in the irreversible capacity in the first cycle and excellent in cycle characteristics.

Further, according to the process of this invention for producing graphite particles, there can be obtained graphite particles suitable for use in lithium secondary batteries excellent in rapid charge-discharge characteristics and cycle characteristics or lithium secondary batteries small in the irreversible capacity of the first cycle and excellent in cycle characteristics or lithium secondary batteries small in the irreversible capacity of the first cycle and excellent in rapid charge-discharge characteristics and cycle characteristics.

Further, the graphite paste of this invention is suitable for use in lithium secondary batteries excellent in rapid charge-discharge characteristics and cycle characteristics, or lithium secondary batteries small in the irreversible capacity of the first cycle and excellent in cycle characteristics, or lithium secondary batteries small in the irreversible capacity of the first cycle and excellent in rapid charge-discharge characteristics and cycle characteristics.

Further, the negative electrode material for lithium secondary battery of this invention and the process for production thereof are suitably applicable to lithium secondary batteries high in capacity and excellent in rapid charge-discharge characteristics and cycle characteristics, or lithium secondary batteries small in the irreversible capacity of the first cycle and excellent in cycle characteristics, or lithium secondary batteries small in the irreversible capacity of the first cycle and excellent in rapid charge-discharge characteristics and cycle characteristics.

Further, the lithium secondary batteries of this invention are high in capacity and excellent in rapid charge-discharge characteristics and cycle characteristics, or small in the irreversible capacity of the first cycle and excellent in cycle characteristics, or small in the irreversible capacity of the first cycle and excellent in rapid charge-discharge characteristics and cycle characteristics.

What is claimed is:

1. A negative electrode for a lithium secondary battery obtained by integrating a mixture of a graphite particle and an organic binder together with a current collector, said graphite particle having an aspect ratio of 1.2 to 5 and a crystallite size Lc in a c-axis direction of crystal (002) of 1,000 to 100,000 Å, and the mixture of a graphite particle and an organic binder after integration with pressing having a density of 1.5 to 1.9 g/cm$^3$.

2. The negative electrode for a lithium secondary battery according to claim 1, wherein the graphite particle has a specific surface area of 1.5 to 5 m$^2$/g.

* * * * *